(12) United States Patent
Glazberg et al.

(10) Patent No.: US 12,078,499 B2
(45) Date of Patent: Sep. 3, 2024

(54) AUTONOMOUS VEHICLES IMPLEMENTING USER-BASED ETHICAL DECISION MAKING

(71) Applicant: Glazberg, Applebaum & Co., Advocates and Patent Attorneys, Ramat Gan (IL)

(72) Inventors: Ziv Glazberg, Haifa (IL); Shmuel Ur, Shorashim (IL)

(73) Assignee: GLAZBERG, APPLEBAUM & CO., Ramat Gan (IL)

(*) Notice: Subject to any disclaimer, the term of this patent is extended or adjusted under 35 U.S.C. 154(b) by 0 days.

(21) Appl. No.: 18/334,202

(22) Filed: Jun. 13, 2023

(65) Prior Publication Data
US 2023/0332910 A1    Oct. 19, 2023

Related U.S. Application Data

(60) Division of application No. 17/384,974, filed on Jul. 26, 2021, now Pat. No. 11,713,974, which is a continuation of application No. 16/423,539, filed on May 28, 2019, now Pat. No. 11,105,645.

(51) Int. Cl.
*G01C 21/34* (2006.01)
*B60T 8/17* (2006.01)
*G05D 1/00* (2024.01)

(52) U.S. Cl.
CPC ............ *G01C 21/3484* (2013.01); *B60T 8/17* (2013.01); *G01C 21/3461* (2013.01); *G05D 1/0088* (2013.01)

(58) Field of Classification Search
CPC .............. G01C 21/34; G05D 1/00; B60T 8/17
USPC .......................................................... 701/25
See application file for complete search history.

(56) References Cited

U.S. PATENT DOCUMENTS

| | | | |
|---|---|---|---|
| 2015/0202770 A1* | 7/2015 | Patron | G05D 1/024 901/50 |
| 2018/0089563 A1* | 3/2018 | Redding | G06N 3/006 |
| 2018/0364700 A1* | 12/2018 | Liu | G05D 1/0038 |

FOREIGN PATENT DOCUMENTS

| | | | | |
|---|---|---|---|---|
| EP | 3454269 A1 * | 3/2019 | | B60W 30/00 |
| WO | WO-2017214581 A1 * | 12/2017 | | G05D 1/0088 |

* cited by examiner

*Primary Examiner* — Tuan C To

(57) ABSTRACT

A method, system and product for implementing user-based ethical decision making in autonomous vehicles. The system includes an ethical investigator that presents an ethical questioner to an entity and collects the entity's responses. An ethical synthesizer synthesizes an ethical preference of the entity based on the collected responses. An ethical determinator selects an action from a plurality of potential actions based on an ethical preference of a controlling entity of a self-driving vehicle at a time the selection is made. The system is configured to cause the self-driving vehicle to perform the action selected by said ethical determinator automatically and without relying on user input.

20 Claims, 12 Drawing Sheets

AUTONOMOUS VEHICLES IMPLEMENTING USER-BASED ETHICAL DECISION MAKING

CROSS-REFERENCE TO RELATED APPLICATION

This application is a divisional of and claims the benefit of U.S. application Ser. No. 17/384,974, filed Jul. 26, 2021, entitled "USER-BASED ETHICAL DECISION MAKING BY SELF-DRIVING CARS", which is a continuation of U.S. application Ser. No. 16/423,539, now U.S. Pat. No. 11,105,645 filed May 28, 2019, entitled "NAVIGATION IN VEHICLES AND IN AUTONOMOUS CARS", which are hereby incorporated by reference in their entirety without giving rise to disavowment.

TECHNICAL FIELD

The present disclosure relates to self-driving cars in general, and to ethical decision making of self-driving cars, in particular.

BACKGROUND

Computerized navigation systems are becoming more and more essential for day to day driving. As such systems may be aware of traffic loads and other changes in real time, they are crucial not only when driving an unknown route, but also when driving daily routes. As an example a passenger may be driving to work and a navigation system may detect a traffic jam and offer an alternative route.

In the near future, autonomous cars are expected to take a major role in transportation. Such cars may be used as private cars but also as taxis—for shared rides as well as for private rides. Autonomous cars are already available today, and make use of traditional navigation systems, in order to select an optimal route, such as the shortest route to a desired destination.

BRIEF SUMMARY

One exemplary embodiment of the disclosed subject matter is a system relating to an operation of a self-driving vehicle, wherein the system comprising: a processor and a memory coupled thereto; an ethical investigator configured to present an ethical questioner to an entity and collect responses of the entity to the ethical questioner; an ethical synthesizer configured to synthesize an ethical preference of the entity based on the responses collected by said ethical investigator; and an ethical determinator configured to select an action from a plurality of potential actions each associated with a different potential alternative outcome, wherein said ethical determinator is configured to select the action based on an ethical preference of the controlling entity of the self-driving vehicle at a time the selection is made, wherein said system is configured to cause the self-driving vehicle to perform the action selected by said ethical determinator automatically and without relying on user input.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
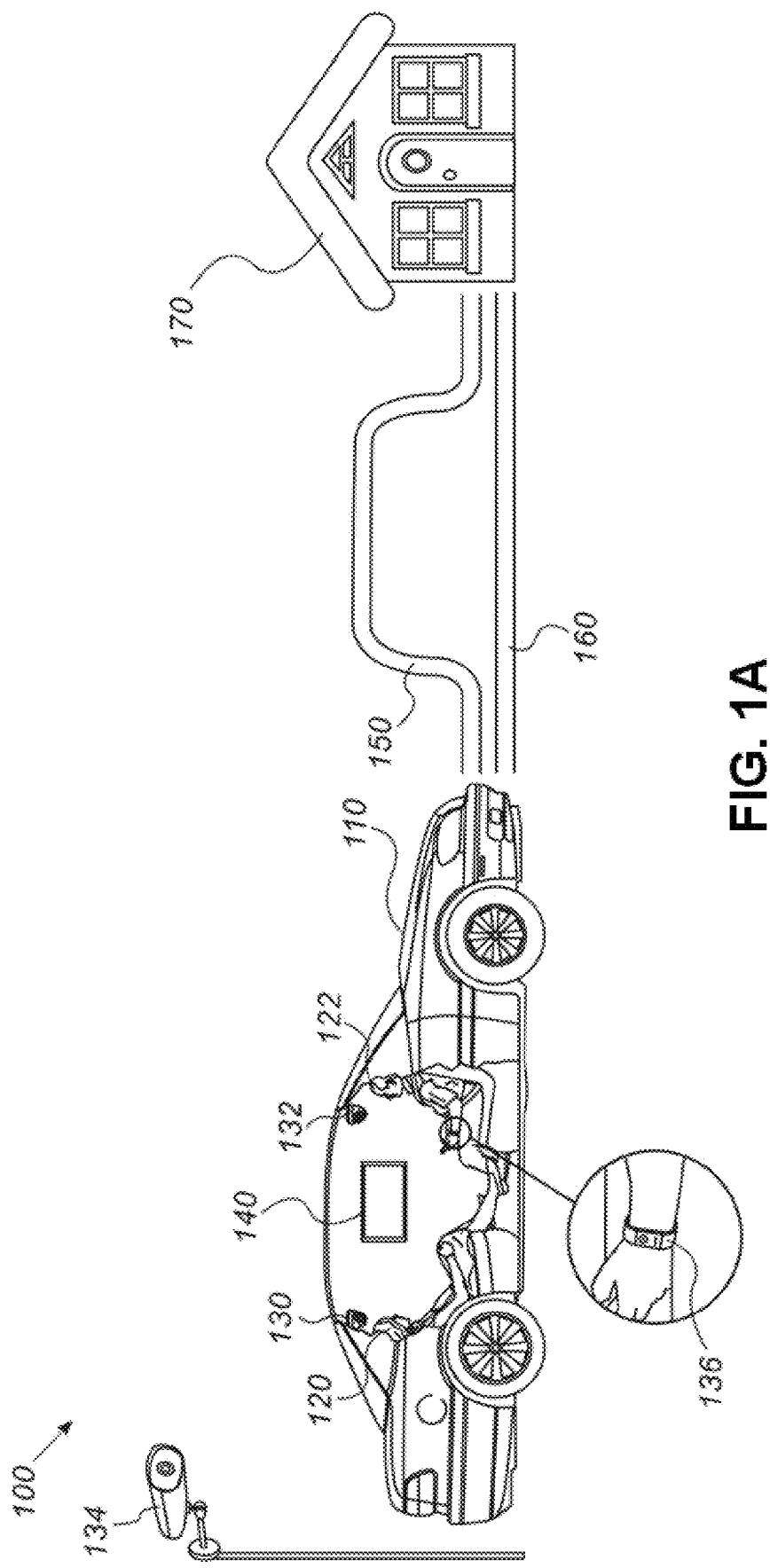
FIGS. 1A-1B show environments in which the disclosed subject matter is used, in accordance with some exemplary embodiments of the subject matter.

One technical problem dealt with by the disclosed subject matter is to provide a navigation system that allows passengers to finish their current activity. The passengers activity may by an activity such as but not limited to sleeping, watching a movie, playing a game, or the like.

Specifically in autonomous vehicles, where none of the passengers are engaged in the driving activity, the passengers may perform other activities. The passengers may watch movies, sleep, eat, conduct a conversation, or the like. It may be desired to avoid interrupting the activity unnecessarily, such as by reaching the destination prior to the passengers completing their activities. However, it is noted that in human-driven vehicles, the disclosed subject matter may be applicable with relation to the non-driver-passengers.

One technical solution is to obtain data about a passenger of the vehicle, analyze the data and determine that the passenger is engaged in an activity. In response to such determination, a route for the vehicle may be determined. The determined route may be a route for which its driving time is longer than other potential routes to the destination. Additionally or alternatively, the determined route may be a route in which the expected noise level is below a predetermined threshold, so as to reduce potential interference with the activity. Additionally or alternatively, the determined route may be a route in which the vehicle orientation is configured to reduce or avoid a light reaching the eyes of the passenger. Additionally or alternatively, the determined route may drive through roads that cause the vehicle to vibrate in a vibration frequency within a predetermined frequency range. In some cases, different activities may be affected, positively or negatively, by different frequency ranges. Additionally or alternatively, the route may include a reduced number of speed bumps, such as below a predetermined threshold, minimize the total number of speed bumps, optimize the timing of reaching speed bumps with respect to the activity, or the like.

In some exemplary embodiments, data about the passenger may be obtained and utilized in determining constraints on the driving route to be used by the vehicle. The constraints may be utilized when generating a driving plan for the vehicle. In case the vehicle is an autonomous vehicle, the driving plan may be implemented automatically and the autonomous vehicle may drive according thereto. Additionally or alternatively, the driving plan may be implemented by a human driver driving the vehicle. In some exemplary embodiments, the constraint may be a constraint causing the driving route to be non-optimal from the standpoint of the driving time and/or driving distance. Instead, the constraint may cause the vehicle to drive more time and/or cover larger distance, so as to enable the passengers to complete their activities uninterrupted. In some exemplary embodiments, as the driving distance and/or duration may be increased, the driving plan may avoid toll roads, which may provide improvements in these parameters of the journey, while reducing overall costs of the journey.

In some exemplary embodiments, the passengers of the vehicle may be monitored with a sensor such as but not limited to a camera, a motion sensor, a microphone, or the like. In some exemplary embodiments, an internal camera permanently or temporarily fixed to the vehicle may be used. Additionally or alternatively, external cameras, such as located in a permanently location, that may occasionally watch the vehicle may be utilized. Additionally or alternatively, sensors of user devices, such as mobile phones, wearable devices, or the like, may be utilized to gather information useful for monitoring the passengers' activity. Additionally or alternatively, data about the passengers may be obtained from other devices that are in the vehicle, permanently or temporarily, such as screens, infotainment system, mobile phones, tablet computers, or the like. Using the information gathered about the passengers of the vehicle, the activity may be determined. It is noted that in some cases the data may be gathered without the assistance or awareness of the passengers, in an autonomous manner. Additionally or alternatively, the passengers may provide explicit input to a computerized system, instead of relying on automated monitoring of their activities.

In some exemplary embodiments, the activity of the passengers may change over time. In some exemplary embodiments, sensors may be used to continuously monitor the passengers, and based on the continuous monitoring, detect a change in the activity. For example, an awakeness status of a passenger may change over time from "awake and tired", to "dozing off", to "napping", to "deep sleep" and to "waking up". As another example, a passenger engaged in watching a movie may be interrupted by a phone call and instead be engaged in conversation over the phone call. In some exemplary embodiments, the disclosed subject matter may analyze the data gathered about the passengers periodically to determine a current activity thereof. As a result, a change in the activity may be identified. In response to identifying a change in the activity, the current location of the vehicle may be obtained, and a driving route may be re-calculated.

In some exemplary embodiments, the determined constraint on the driving route may be set to allow the passengers to enjoy their activity, uninterrupted. For example, for a movie watching activity, it may be desired to avoid vibrations and speed bumps, and to provide as smooth as possible of a ride. As another example, certain road types may be useful in assisting a child fall to sleep, by causing vibrations to be applied on the child. Additionally or alternatively, micro-brake patterns may be applied to cause desired vibrations. As yet another example, orientation of the passengers may be taken into consideration, as well as shading and current location of the sun and other light sources, so as to reduce amount of light reaching the passenger's cabin in general. In some exemplary embodiments, the constraint may be designed to reduce amount of light reaching a sleeping passenger's eyes. As yet another example, if the only possible route is via a road with speed bumps, and if the passenger is drinking, the disclosed subject matter may change the driving plan as to drive more slowly, allowing the passenger to finish his drink prior to the vehicle reaching the road with the speed bumps.

In some exemplary embodiments, the passenger's activity may be an activity which requires as dark environment with low illumination. Such activity may be activity such as but not limited to sleeping, watching a movie, or the like. In response to determining that the passenger is engage in such an activity the vehicle may be configured to rotate the passenger's seat, as the passenger will face an opposite direction from the main light source, dim the vehicle's inner lights, or the like.

One technical effect of utilizing the disclosed subject matter is to allow the passenger to finish an activity that he was engaged in while riding the vehicle. In some exemplary embodiments, in order to avoid interrupting the activity, the driving time and/or driving distance is extended, potentially increasing resource utilization (e.g., wear and tear of the vehicle may be increased; increased fuel consumption; or the like).

Another technical effect of utilizing the disclosed subject matter is to affect the driving characteristics of the vehicle based on the activities of its passengers. For example, a smoother driving plan may be applied, when a passenger is participating in a video conference. As another example, the vibration level that is applied on the passengers while riding the vehicle may be selected to be an optimal desired vibration level, such as a level useful for assisting in falling asleep, remaining asleep, watching a video screen, or the like. The passengers may therefore be subject to a selectable level of vibrations and may be vibrated at a desired frequency level or ranges.

Yet another technical effect of utilizing the disclosed subject matter may be an improvement of resource consumption during the journey of the vehicle. In some exemplary embodiments, the driving plan may provide different speed suggestions that are lower than the maximal speed limits in different road segments. Additionally or alternatively, the vehicle may be driven in an optimal speed, from a fuel consumption point of view, which may be lower than a maximal speed limit. As a result, improved fuel or electrical consumption may be achieved in such road segments. Additionally or alternatively, reduced wear and tear of the vehicle may be achieved. By limiting the driving speed, driving in curves in a suitable manner, or the like, the stress to the engine, tiers, springs, or the like, may be reduced.

Another technical problem dealt with by the disclosed subject matter is to provide a navigation system which takes into account the activities and destinations of different passengers, and provides an optimal driving plan in view thereof.

One technical solution is to determine that two passengers are heading to different locations and determine a constraint on the drop-off order of the passengers. The drop-off order may require that the journey be longer than the minimal journey, both in time and distance. For example, instead of reaching the closest destination first, a farther destination is reached and then the vehicle may backtrack the route to reach the closest destination.

In some exemplary embodiments, the drop-off order may be determined based on the activities of the passengers and expected end time thereof. For example, it may be preferred to drop off a passenger who is awake prior to dropping off a sleeping passenger. As another example, it may be preferred to allow a passenger to complete watching a movie and dropping off another passenger first, instead.

In some exemplary embodiments, the drop-off order may be determined based on the purpose of the journey and the destination to which the passengers are heading towards. For example, a first passenger may have a 3:00 pm meeting while a second passenger may be destined to take the 2:30 pm bus. Although, the destination of the first passenger might be closer, the second passenger may be dropped off first. In some exemplary embodiments, an electronic schedule of the passenger may be queried to obtain calendar events thereof. Based on the calendar events, a constraint on the arrival time at the destination for the passenger may be determined. As another example, the drop-off time may be affected by the expected end time of the current activity, such as when the movie being watched is expected to end, when the passenger is expected to lose interest in the movie or phone conversation, an expected wakeup time of a sleeping passenger, or the like.

Another technical solution is to determine that two passengers that are heading to the same location, be dropped off at different times at the same location. In one example, a parent and child may be returning home. The child may fall asleep prior to reaching their home. As a result, the journey may comprise a first leg of reaching their home and a second leg of driving around until the child wakes up. The parent may be dropped off first at the end of the first leg, while the child may continue riding the vehicle and being dropped off at the end of the second leg, presumably after waking up or sleeping a sufficient amount of time.

In some exemplary embodiments, the drop off time of a passenger may be dictated by external elements, such as a start time of an event to which the passenger is heading. For example, the passenger may be driving to a face-to-face meeting, may be driving to a train station to take a train, driving to a cinema to watch a movie, or the like. The event may have a start time that may be a-priori known, such as from the passenger's calendar, from a train timetable available online, from the cinema's website, or the like. In some cases, the passenger may want to reach the destination exactly at the start time. Additionally or alternatively, the passenger may require additional time after being dropped off, such as for purchasing tickets, reaching the platform, or the like. Additionally or alternatively, the passenger may not wish to reach the destination ahead of time and may be indifferent to being late by a predetermined amount of time. For example, the passenger may be heading to watch a movie at the cinema and she may be aware that there are about 10 minutes of commercials before the actual screening of the movie. Hence, the passenger may wish to arrive at the start time and may be indifferent to being late by no more than 10 minutes.

In some exemplary embodiments, a constraint may be defined on the driving route to ensure the passenger reaches the destination at the desired time or desired timeframe. In some exemplary embodiments, the constraint may be formulated as follows: $StartTime^P - MaxEarly \leq ArrivalTime^P \leq StartTime^P + MaxLate$, where $ArrivalTime^P$ is the time in which the passenger P arrives at the destination, $StartTime^P$ is the start time of the event to which the passenger P is heading and MaxEarly and MaxLate define the acceptable time boundaries: the maximal time the passenger agrees to wait if she reaches the event prior to its start time (MaxEarly) and maximal tardiness time (MaxLate). In some exemplary embodiments, if the passenger desires to ensure she is not late, MaxLate may be 0. Additionally or alternatively, if the passenger requires a setup time after being dropped off, such as for reaching the platform, buying tickets, or the like, MaxLate may be a negative value. In such a case, $MaxEarly \leq |MaxLate|$. It is noted that $ArrivalTime^P$ may be defined as the driving start time to which the driving duration until reaching the passenger's destination.

It is further noted that the $StartTime^P$ may represent an expected end time of the current activity of the passenger P, and therefore expected potential start time of a next activity. For example, the current activity may be watching a movie and $StartTime^P$ may represent the time at which the movie is expected to end. As another example, $StartTime^P$ may be the expected time in which the passenger is expected to wake up. In such a case, it may be desired to reach the destination after the activity end (i.e., MaxEarly=0), and drop off the passenger within a reasonable time after the activity ends (e.g., within 5 minutes, 10 minutes, or the like).

One technical effect of utilizing the disclosed subject matter is creating a driving route that is on its face inefficient and non-optimal, but provides an optimal solution to the preferences of the passengers themselves. In some cases, such a driving route may be generated and implemented automatically.

One technical problem dealt with by the disclosed subject matter is to allow such a system to improve over time. In some exemplary embodiments, passengers may fail to finish their activity due to the circumstances of the road or trip. For example, an activity, such as conducting a video conference, may rely on having an active Internet connection. However, the selected route may pass through a road segment where connection is poor and due to connectivity loss, the activity may be interrupted. As another example, a road segment may turn out to be noisy and interfere with the passenger's sleep. As yet another example, the road segment may turn out to cause a vibration at a specific frequency that may be inadequate to the passenger's current activity.

One technical solution may be to aggregate data that was gathered during execution of driving plans over time and with respect to different passengers. The data may be data about roads, about trips, about trips, about passengers, the route, passenger's activity, the vehicle, the vehicle's equipment, Internet connectivity during each segment of the route, vibration frequency in the passengers' cabin of the vehicle during each segment of the route, noise levels in the passengers' cabin of the vehicle during each segment of the route, or the like. In some exemplary embodiments, each vehicle may send data to a remote cloud server, database, or the like. Aggregation of such data may enable a machine learning algorithm to be executed on the data. Target functions of machine learning algorithm may be targets such as but not limited to: allowing passengers to finish their activity, optimizing passenger's sleep quality, reducing noise levels in the cabin, optimizing vibration frequency in the cabin to reach a desired level or range, allowing passengers to arrive to their next event on time, or the like. In some exemplary embodiment, passengers may be asked about their experience. A question that the passengers may be asked may be a question such as but not limited to "did you manage to sleep?", "how would you rate the quality of sleep?", "have you arrived on time to your meeting?" "Have you enjoyed eating in the vehicle?", or the like. The question may be provided using any digital means, such as but not limited to a popup in a web page, a notification in an application, an email, or the like. The question and answer thereto may enable supervised machine learning. In other exemplary embodiments, there may be a set of questions. As an example, a passenger may be asked "Did you managed to sleep? Was the route quite enough? Please rate the quietness of the route". The passengers' answers may be sent to a remote cloud server, to a database, or the like, and may be used as part of a training data set for supervised machine learning tools. Additionally or alternatively, observed outcomes may be obtained and used as part of the training data set. For example, using monitoring of the awakeness status of the passenger, the quality of sleep may be estimated and such estimation may be used as part of the training set. As another example, actual observed vibration frequency, noise levels, connectivity status, light in the cabin, or the like, may be gathered and used to improve prediction of such parameters in future driving plans.

One technical effect of utilizing the disclosed subject matter may be that more passengers are able to finish their activities as a result of routes selection and/or utilization of the vehicle's devices, costs reduction over time, less energy consumption over time, or the like. As an example, by receiving answers from passengers, it may be possible to conclude that in case that the passenger is a sleep it is better to dim the inner lights of the vehicle rather then turning the inner lights off. Based on big data that may be crowdsourced over time, the automatic determination of driving plans may be improved, so as to better fulfill the passengers' needs and requirements when the plan is executed.

Another technical problem dealt with by the disclosed subject matter is to provide a decision taking system that can be used in case of an impending accident. In some exemplary embodiments, the vehicle may be an autonomous vehicle that will take decisions by itself in general, and also in case of impending accident. However, as a result, ethical questions may be raised: what outcome is preferred? As an example, in case of an accident, the vehicle may hit a child that is on the road, while deviating may imply hitting a number of aged people. As another example, would one prefer to have the passenger killed or would you rather the outcome of the accident be killing several bystanders instead? As yet another example, even a decision to prefer killing animals over people may not be in consensus, such as if the vehicle would hit cows that are believed to be sacred in some Indian religions. As can be appreciated, the ethical decision may be a hard one, and different people may have different views on the correct answer. It may be that the vehicle manufacturer and/or the self-driving system manufacturer may not want to implement such decision taking system and face the repercussions of their decisions. Such a problem may be one of the major obstacles in making autonomous cars into reality.

One technical solution may be a system that may be adjustable to implement different decisions based on different ethical preferences of different people. For example, the decisions may be based on ethical preferences of a passenger, or of an owner of the vehicle, or the like.

In some exemplary embodiments, the system may comprise components such as but not limited to an ethical investigator, an ethical synthesizer and an ethical determinator. The ethical investigator may present the person with a questioner. The questioner may comprise ethical questions which based on the answers thereto the ethical decision may be made. The ethical investigator may send the answer and/or the question to the ethical synthesizer.

The ethical synthesizer may synthesize, based on the answer and/or the question, an ethical preference function. For example, a function of IsBetter(A, B) may be synthesized to determine, based on the answers to the questions, which parameters of outcome A and outcome B are taken into consideration when determining whether A is preferable over B to the specific person.

During the vehicle's regular operation, decisions may be made which outcome is preferred using the synthesized ethical preference function. In some exemplary embodiments, upon determining that an accident is impending, the vehicle may send to the ethical determinator data about the current situation of the vehicle and about the vehicle surroundings. The data that is sent may include for example, data about the environment of the vehicle, data about the vehicle, data about the passenger, data about bystanders, or the like. The data about the vehicle's environment may be data such as but not limited to data about the road's status, objects, people and animals that are near the vehicle, the vehicle velocity, or the like. Additionally, or alternatively, the alternative outcomes may be provided explicitly to the ethical determinator. In some exemplary embodiments, the ethical determinator may determine which outcome is preferred and instruct the autonomous vehicle's digital driver to take action leading to the preferred outcome (e.g., if outcome A is preferred over outcome B, then Action X leading to outcome A may be taken, instead of Action Y that would lead to outcome B).

In some exemplary embodiments, the ethical determinator may be invoked whenever there are two or more potential outcomes that the navigation system is indifferent therebetween. For example, if the navigation system concludes that two potential roads are equivalent given its task and goal, as may be the case when both roads lead to the target location at the same driving time and distance, the ethical determinator may be consulted to select between the two options based on the predicted outcomes. For example, one of the roads may be more polluted, and the ethical determinator may be configured to weight this parameter in to prefer avoiding over-polluting that road.

In some exemplary embodiments, the ethical decisions may be synthesized based on preferences of several people. For example, if there are several passengers, their preferences may be combined to provide a joint-preference function.

One technical effect of utilizing the disclosed subject matter may be that an autonomous vehicle may take ethical decisions based on a person's ethical preferences, such as a passenger, a group of passengers, an owner thereof, or the like. By allowing the vehicle to take ethical decisions based on the passenger's ethical preferences the vehicle manufacturer and/or the self-driving system manufacturer may be released from the burden of pre-designing a one-fits-all ethical preference and from the related legal and moral implications. In some exemplary embodiments, the technical effect may be different driving operations of an autonomous vehicle, depending on the different ethical preferences.

It is noted that the disclosed subject matter may provide for a configurable-autonomous vehicle. The configurable autonomous vehicle may allow its users to control the ethical decisions of how such an instrument is actually being used. As is the current state where a human driver makes his decisions while using the vehicle, the autonomous vehicle may be enabled to similarly implement the decisions of the human "driver".

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing an environment, in accordance with some exemplary embodiments of the subject matter.

An Environment 100 may comprise a Vehicle 110, such as a car, a bus, a taxi, a shuttle, or the like. Vehicle 110 may be capable of driving passengers (such as Passenger 120 and Passenger 122) riding thereon to their destination. In some cases. Vehicle 110 may comprise a driver's seat (not shown), enabling a human driver to drive Vehicle 110. Additionally or alternatively, Vehicle 110 may be an autonomous vehicle, driving without human assistance, or a semi-autonomous vehicle, in which Vehicle 110 may assist a human driver in driving, such as when driving in highways, driving in traffic jams, or the like. In some cases, a semi-autonomous vehicle may drive autonomously while being supervised by a human driver (not shown). The human driver may take over and replace an autonomous driving module, such as when the human driver believes the autonomous driving module is malfunctioning, may cause an accident, or the like.

In some exemplary embodiments, Vehicle 110 may be an autonomous vehicle. An autonomous vehicle may be a vehicle that may be capable of sensing its environment and navigating without human input. Autonomous vehicles may combine a variety of techniques to perceive its surroundings, including radar, laser light, Telematic Control Unit (TCU), Global Positing System (GPS), odometry, computer vision, or the like. In some exemplary embodiments, control systems may be used to interpret sensory information and identify obstacles to avoid, relevant signage, or the like. Based on the identified objects and information, a navigation path may be determined.

In some exemplary embodiments, Vehicle 110 may not comprise any driver seat, as is illustrated in FIG. 1A. In some exemplary embodiments, none of the passengers riding the autonomous vehicle, such as Passengers 120 and 122, are required to drive Vehicle 110, allowing each passenger to sleep, eat, work, play, watch videos, listen to audio, talk with other passengers, talk with people that are outside vehicle, or the like.

In some exemplary embodiments, Vehicle 110 may be a connected car. Vehicle 110 may be connected to a computerized network (not shown), such as the Internet. In some exemplary embodiments, Vehicle 110 may be connected via the computerized network to other vehicles (not shown). Internet of Things (IoT) devices, other vehicles, cloud-based services, computer servers, or the like. Vehicle 110 may be equipped with Internet access. Additionally or alternatively, Vehicle 110 may be connectable to a wireless network, such as Wireless Local Area Network (WLAN).

In some exemplary embodiments, Vehicle 110 may be a vehicle which is used for ridesharing, such as real-time ridesharing, dynamic ridesharing, or the like. Real-time ridesharing may be a ridesharing service that relies on advanced mobile phone technologies. Real-time ridesharing may attempt to provide added flexibility to rideshare arrangements, by allowing drivers and passengers to arrange occasional shared rides ahead of time or on short notice, such as in few minutes, one hour, or the like. As an example, Vehicle 110, may be configured to pick up and drop off passengers during a ride thereof. In such cases, the route of Vehicle 110 may be flexible and dynamically changed based on the location or the destination of the ridesharing passengers.

In some exemplary embodiments, the disclosed subject matter may be embodied as an Application Programmer Interface (API) for navigation systems, such as but not limited to WAZE™, GOOGLE MAPS™, or the like. The navigation systems may be applications that may be installed on a computational device associated with Vehicle 110, such as a smartphone of one of the passengers riding Vehicle 110. Additionally or alternatively, a navigation system may be installed on an infotainment system of Vehicle 110. A user of the installed navigation system may choose a destination and the application may be configured to offers one or more optional routes for the destination. While driving to the destination, the application may direct the driver using alerts, such as sounds, maps, or the like.

In some exemplary embodiments, Vehicle 110 may be equipped with a management entity (not shown) that is configured to connect computerized devices in Vehicle 110. As an example, the management entity may be connected to a Camera 130 and a Camera 132, that may be configured to provide a visual input of passengers riding Vehicle 110. As another example, the management entity may be connected to computerized devices of passengers riding Vehicle 110, such as a Smart Wristband 136 worn by Passenger 122. As yet another example, the management entity may be connected to a Screen 140 within Vehicle 100 that may be utilized for providing visual content to passengers riding Vehicle 110. Additionally or alternatively, the management entity may be connected to other mechanical or computational components of Vehicle 110, such as a modem, a router, an engine, inner lights, electrical windows, or the like.

In some exemplary embodiments, the management entity may be configured to obtain data from the modem or the router and may analyze the data in order to know what data is directed to Screen 140. The data may be analyzed by obtaining the Uniform Resource Locator (URL) of the data, determining the protocol that is being used, or the like. As an example, upon obtaining a URL which may point to a resource hosted by the British Broadcasting Corporation (BBC) and a protocol which may be Moving Picture Experts Group-Dynamic Adaptive Streaming over Hypertext Transfer Protocol (HTTP) (MPEG-DASH), it is possible to configure the management entity to conclude that Passenger 120 is watching a video. As yet another example, upon obtaining a URL which may be hosted on BBC's servers and a protocol which may be HTTP, the management entity may be configured to conclude that Passenger 120 is surfing on the BBC's web site.

In some exemplary embodiments, the management entity may be connected to sensors that are in Vehicle 110, such as but not limited to Vehicle Speed Sensor (VSS), Wheel Speed Sensor (WSS), light sensors, noise sensors, humidity sensors, cameras (e.g., 130, 132), or the like. In some exemplary embodiments, the sensors, such as Cameras 130, 132 may be fixed or dynamically moveable, such as being configured to rotate or move in order to observe the entire passenger cabin of Vehicle 110 and/or external environment thereof. The sensors may be used to monitor the activity of Passengers 120, 122, identify road conditions, measure physical attributes related to the road segment, or the like. Additionally or alternatively, the management entity of Vehicle 110 may be connected, via the Internet, to devices and databases external to Vehicle 110. As an example, the management entity may be connected to cameras that are located outside Vehicle 110 and may be observing the road or Environment 100, such as but not limited to Camera 134. As another example, the management entity may be connected to IoT devices, traffic lights, weather reports databases, real time traffic status databases, passengers' calendars, databases providing passengers' medical history, passengers' social media data, or the like.

In some exemplary embodiments, the management entity may be configured to change the state of the devices connected thereto. As an example, the management entity may be configured to obtain data from a light sensor and change the opacity of the windows in order to darken the passenger cabin of Vehicle 110.

In some exemplary embodiments, Vehicle 110 may be used to drive one or more passengers, such as Passenger 120 and Passenger 122. The pickup location of Passengers 120 and 122 may or may not be identical. Additionally or alternatively, the destination of Passengers 120 and 122 may or may not be identical. Additionally or alternatively, the data that is obtained about Passengers 120, 122 may comprise, for example, demographic information about the passengers, social relationship therebetween, awakeness statuses thereof, or the like. In some cases, the data about Passengers 120, 122 may be utilized to influence the driving plan of the vehicle. For example, the awakeness status of Passengers 120, 122 may be utilized to determine whether to prolong the trip for one of them or both, to enable natural wakeup. As yet another example, in case of family members, it may be determined that both passengers wish to disembark together at the same time. Additionally or alternatively, if the family members are parent and child, and they are the only passengers, it may be determined that the parent may be dropped off while the child is still sleeping, and the child may be dropped off later when he wakes up. Additionally or alternatively, the activity of the passengers may be identified, such as it may be determined that the passengers are eating a meal or are having a discussion therebetween. The disclosed subject matter may determine to prolong the trip for both passengers based on a shared activity and its estimated end time. As another example, the disclosed subject matter may identify that the shared activity is shared among a subset of the passengers, and drop off non-participating passengers before its conclusion. As yet another example, some passengers may be more invested into the shared activity than others. Consider three passengers watching a movie together. One passenger may have already seen the movie and may prefer to be dropped off before the movie ends, while other passengers may wish to see the movie until its very end.

In some exemplary embodiments, the disclosed subject matter may utilize a recognition module (not shown), such as but not limited to a facial recognition module, a behavioral recognition module, an emotion recognition module, or the like. As an example, the disclosed subject matter may monitor activity of Passenger 120 using Camera 130. The disclosed subject matter may imply a facial recognition module to identify Passenger 120 and utilize an emotion recognition module to determine that Passenger 120 is angry. In response to such determination, it may be possible to take an action such as but limited to play a relaxing music, dim the lights in Vehicle 110, or the like.

In some exemplary embodiments, monitoring Passenger 120 may be performed using wearable devices or user devices associated therewith, such as Smart Wristband 136. Smart Wristband 136 may be equipped with sensors configured to detect abnormal and unforeseen situations, monitor physiological parameter, or the like. Additionally or alternatively, Smart Wristband 136 may allow continuous monitoring of Passenger 120. Smart Wristband 136 may enable monitoring of bio-medical information of Passenger 120, such as but not limited to, body temperature, heart rate, brain activity, muscle motion or the like. Smart Wristband 136 may be equipped with connectivity hardware, such as but not limited to, Bluetooth (BT), WiFi, Near Field Communication (NFC), cellular modem, or the like. Smart Wristband 136 may periodically transmit data that is being collected by its sensors to connected devices such as but not limited to Vehicle 110, the management entity, Passenger's 120 smartphone or the like. Vehicle 110 may connect to a Smart Wristband 136 and receive data therefrom. Additionally or alternatively, Passenger 120 may have a smartphone and Smart Wristband 136 may be connected to Passenger's 120 smartphone. Vehicle 110 may be connected to Passenger's 120 smartphone and pull Smart Wristband's 136 data.

In some exemplary embodiments, Vehicle 110 may be equipped with a Screen 140 which may be used by Passengers 120, 122 while riding Vehicle 110.

In some exemplary embodiments, there may be alternative routes from the current location of Vehicle 110 to Destination 170 of Passenger 120. As a schematic example, Short Route 160 may be the shortest route in driving time and/or driving distance that can be taken. An alternative route. Route 150 may be longer than Short Route 160. As opposed to other navigation system, the disclosed subject matter may select the longer route, Route 150, over Short Route 160. The selection may be based on the activity of Passenger 120. In some cases, a constraint on the driving route may be determined based on the data obtained about Passenger 120. The constraint may on a driving time, extending the driving time over the minimal driving time. In some cases, the constraint may be configured to allow Passenger 120, who is sleeping, to wake up naturally, configured to allow Passenger 120 to finish his current activity, or the like. The selected route may then be implemented, and Vehicle 110 may be driven along the selected route.

In some exemplary embodiments. Short Route 160 may comprise dropping off Passenger 120 in Destination 170, before dropping off Passenger 122 in another destination (not shown). Based on the constraints on the driving plan, it may be determined that Passenger 122 be dropped first and only thereafter, Passenger 120 be dropped off at Destination 170. Such plan may comprise driving Route 150. As an example, the decision may be based on the calendar entries of the passengers showing that Passenger 122 needs to be dropped off earlier than Passenger 120, based on their activity indicating that the journey of Passenger 120 may be prolonged to enable him to complete his activity (e.g., talk over the phone, watch a movie, eat a meal, sleep, or the like).

Consider the following example. In a ridesharing scenario, Passengers 120, 122 are being driven to their respective destinations. The disclosed subject matter may retrieve information about the calendars of Passengers 120, 122 and identify desired time for each passenger to reach their respective destinations. In order to ensure that both passengers arrive in time, a longer route, Route 150, may be selected. As yet another example, the selection may be performed even before some of the passengers are picked up. By accessing passengers' calendars, it may be determined that Passenger 122 is late for a meeting. As a result, the disclosed subject matter may change the route from intended route as to drop off Second Passenger 122 before even picking up Passenger 120.

Figure 1B:
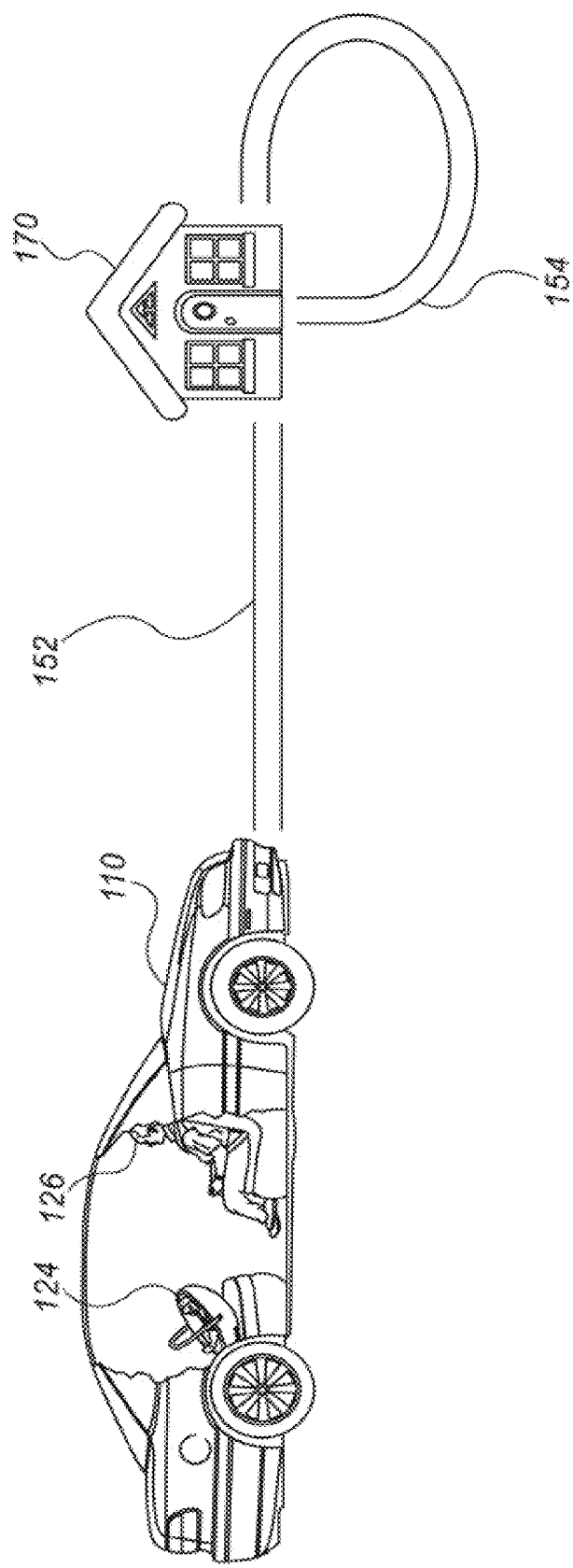

Referring now to FIG. 1B showing an environment in which the disclosed subject matter is used, in accordance with some exemplary embodiments of the subject matter.

In some exemplary embodiments, Passenger 124 may be a child or an infant. Passenger 124 may be sleeping. Passenger 126 may be accompanying Passenger 124. Passenger 126 may be the guardian of Passenger 124, such as his parent. In some exemplary embodiments, Vehicle 110 may determine automatically the relationship between the passengers, such as based on facial recognition, using social networks, based on user-inputted information, or the like.

Passengers 124, 126 may both be headed towards the same destination, Destination 170. Passenger 126 may wish to disembark from Vehicle 110 as soon as possible. However, Passenger 124 may be asleep. In some cases, it may be desired that the infant continues to sleep for a minimal duration, such as at least one hour. During that time, moving the child and dropping him off from Vehicle 110 may result in the undesired result of waking him up. In accordance with the disclosed subject matter, a driving plan may be determined taking the estimated wakeup time or desired sleep duration into account. The driving plan may be constrained by having Passenger 126 dropped off at Destination 170 separately from Passenger 124, having his drop off time be as soon as possible and having the drop off time of Passenger 126 be later, at a desired time range. Based on the constraint, a driving plan comprising of Leg 152 and Leg 154 may be devised. Leg 152 may be a route from of the current location of Vehicle 110 to Destination 170. In some cases, Leg 152 may be the shortest route possible, such as having the shortest driving distance, shortest driving duration, or the like. Leg 154 may start at Destination 170 and may end at Destination 170. The estimated driving time in Leg 152 and in Leg 154 may result in reaching Destination 170 for the second time at a time in which it is estimated Passenger 126 will wake up or at a time at which it may be deemed reasonable to wake him up, such as by using sounding an alarm, rocking the passenger, or the like. The driving plan may be executed, Vehicle 110 may be driven in Leg 152, reaching Destination 170 for the first time, to drop off Passenger 126. While Passenger 124 is still asleep, Vehicle 110 may be driving in Leg 154. When Passenger 126 begins to wake up, Vehicle 110 may reach Destination 170 for the second time. In some exemplary embodiments, before reaching Destination 170 for the second time, Passenger 126 may be alerted, such as via a text message, a push notification, or the like, that Passenger 124 is expected to arrive at Destination 170 in an estimated time. The alert may be useful for Passenger 126 to ready himself to pick up his child, Passenger 124, from Vehicle 110.

It may be noted that Leg 154 may be selected so as to improve the likelihood that an infant at the age of Passenger 124 will remain asleep. For example, conditions such as noise, light, vibration may be estimated to be within desired ranges while driving Leg 154.

Figure 2A:
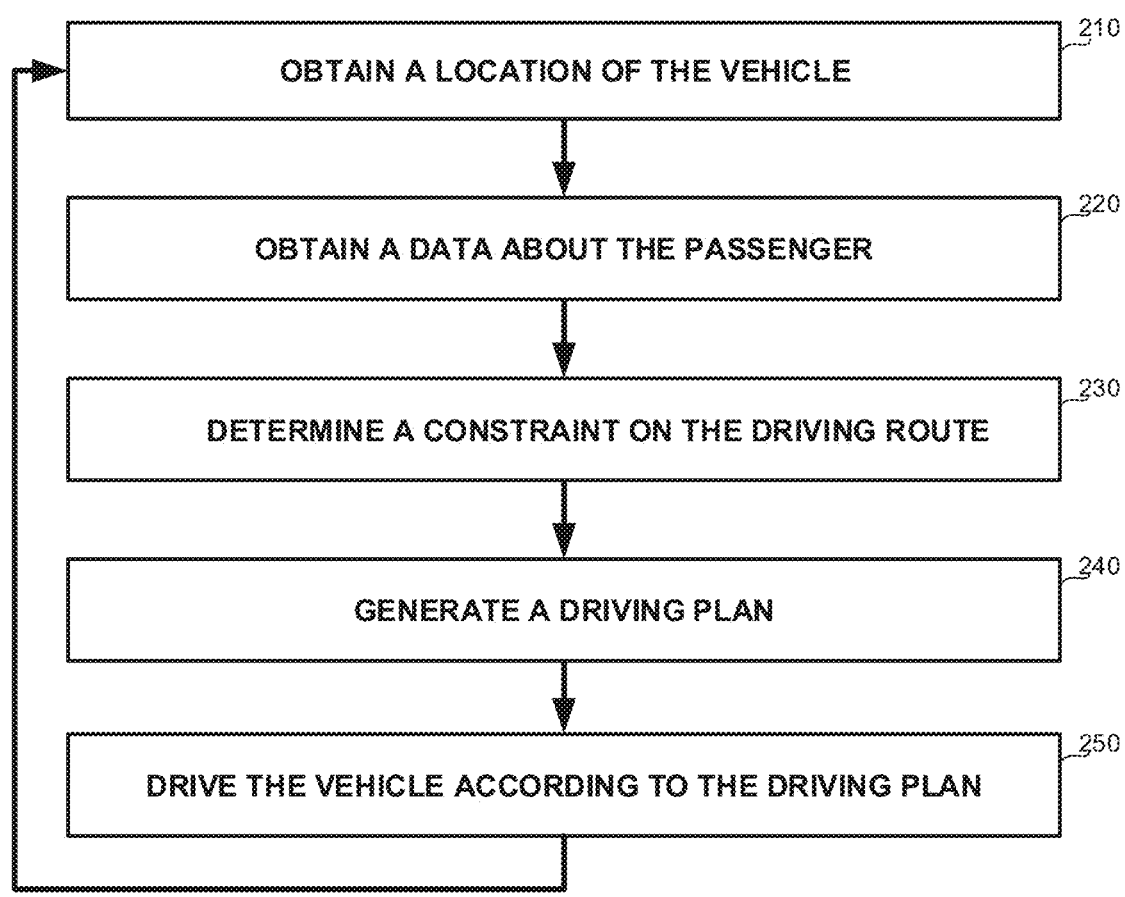
FIGS. 2A-2F show flowchart diagrams of methods, in accordance with some exemplary embodiments of the disclosed subject matter.

Referring now to FIG. 2A showing a flowchart diagram of a method, in accordance with some exemplary embodiments of the disclosed subject matter.

On Step 210, a location of a vehicle, such as 110 of FIG. 1A, is obtained. The location may be obtained from the Telematic Control Unit (TCU) of Vehicle 110. Additionally or alternatively, the location of Vehicle 110 may be obtained by using methods such as but not limited to Global Positioning System (GPS), calculation of the location according to nearby cellular antenna, using Application Programming Interface (API) of third-party location services providers, or the like. In some exemplary embodiments, the vehicle may be equipped with antenna that may receive satellite signals that can be used to calculate the location.

On Step 220, data about a passenger, such as Passenger 120, 122, 124, 126 of FIGS. 1A, 1B, is obtained. The data may comprise, for example, data useful for determining awakeness status of the passenger, data useful for determining a current activity of the passenger, data a schedule of the passenger, or the like. The data may be obtained by using sensors, such as cameras, wearable devices, mobile devices, microphones, or the like. Additionally or alternatively, the data may be obtained from remote servers or from digital datastores. In some exemplary embodiments, e-calendar may be accessed to retrieve the schedule of passenger, digital event entries, or the like.

In some exemplary embodiments, data about the passenger may be obtained from more than one source and may be synthesized. As an example, such method for obtaining data from several sources and synthesizing the data may be, for example, the following. Camera 130 may be used to obtain images of the passenger. It may possible to determine that the passenger is watching a screen (e.g., Screen 140 of FIG. 1A). In response to such determination, it may be possible to send a message to a vehicle-mounted camera, such as Camera 130 of FIG. 1A, to rotate and move in order to monitor Screen 140. A controller of Camera 130 may be equipped with image detection abilities and may know to move and/or rotate until Screen 140 is in the view of Camera 130. By analyzing the images that are on Screen 140 and comparing them with video databases it may possible to determine which video the passenger is watching. Metadata about the video may be obtained and used in order to estimate expected duration of the video. Additionally or alternatively, metadata about the video may be consulted to determine a potential likelihood that passenger would watch another video thereafter, such as in case of a video ending with a cliffhanger. Additionally or alternatively, a second camera, such as Camera 132, may be used to monitor the activity. In some cases, one camera may monitor the screen and the second camera may monitor the passenger, such as to determine engagement level and interest level with the content on Screen 140. Additionally or alternatively, the content of the screen may be obtainable via the infotainment system of the vehicle.

As another example, by accessing the Passenger's calendar it may be possible to know his destination. In some exemplary embodiments, additional information may be obtained from the calendar. As an example, it may be possible to know that the passenger is after a long flight and that he is heading to a conference. Based on such information, and potentially based on the passenger's history or history of passengers similar to the passenger, it may be determined that the passenger would likely want to sleep until the conference starts. In response to such determination, a route which its driving time is as long as possible but that allows the passenger to get to the conference on time may be chosen in Steps 230-250. In other exemplary embodiments by using machine learning and history about all the passengers in all vehicles addressed by the disclosed subject matter, more conclusions about the passengers' status and preferred routes may be drown. Such conclusions may be that some passengers prefer quite routes, while other prefer smooth routes, or the like.

In some exemplary embodiments, by using cameras, such as 130, 132, 134 of FIG. 1A, it may be possible to determine that the passenger is engaged in a conversation with another person. In response to such determination it may be possible to obtain data from the cameras, microphones, mobile devices, wearable devices, or the like, in order to confirm the conversation is between the passenger and another passenger, such as 122 of FIG. 1A. Additionally or alternatively, it may be possible to obtain data from Vehicle's 110 modem in order to check if the passenger is using a Voice over IP (VoIP) service and/or a video chat service and to confirm with whom he is talking. It shall be noted that the passenger may be in conversation with both a passenger and a non-passenger. For example, the passenger may be engaged together with other passengers of the vehicle in a multi-participants conference call. By obtaining the call history of the passenger, a timeframe in which the conversation is expected to end may be determined. The expected end time of the conversation may define the desired travel time within the vehicle, such as sufficient time allowing the passenger to finish the conversation.

In some exemplary embodiments, data about the awakeness status of Passenger 120 may be, for example, data which indicates whether Passenger 120 is awake, asleep, about to fall asleep, or the like. In some exemplary embodiments, if Passenger 120 is asleep then the data about the awakeness status may indicate an estimated duration of the sleep. Additionally or alternatively, if Passenger 120 is awake, then data about the awakeness status may further indicate if Passenger 120 is about to fall asleep and may also indicate a timeframe in which Passenger 120 will fall asleep and a timeframe in which Passenger 120 shall remain asleep. For example, a sleeping pattern of an infant may be utilized to estimate that an infant is about to fall asleep and to estimate an expected sleeping time of 120 minutes. As another example, a sleeping pattern of an adult watching a movie may be utilized to predict that the adult is expected to fall asleep during the movie and wake up approximately 45 minutes after falling asleep.

In some exemplary embodiments, asleep period may be divided to sleep cycles, of which comprises one or more time durations. A time duration may be a light sleep duration, a deep sleep duration, a Rapid Eye Movement (REM) duration, or the like. In some cases, the sleep cycle may have roughly known durations such as an overall duration of about one hour and a half. In some exemplary embodiments, it may be desired not to wake up a person while in the REM duration. Hence, the disclosed subject matter may be used in order to postpone the arrival time and/or the wakeup time until the REM period ends.

In some exemplary embodiments, based on the data, it may be determined that Passenger 120 has fallen asleep. A wakeup time for Passenger 120 may be determined. The wakeup time may be determined based on sleeping cycles. For example, the wakeup time may be estimated end of the current sleep cycle, the estimated end of the sleep cycle at which the passenger is expected to wake up, the estimated end of the sleep cycle that is at the closest time to the expected arrival time, the estimated end of the sleep cycle that is expected to end before the expected arrival time, or the like. Additionally or alternatively, the wake up time may be determined based on a desired minimal or maximal sleeping time duration, so as to allow the passenger to sleep enough time, to avoid over-sleeping, or the like.

Upon determining a wakeup time, a constraint on the arrival time to the destination may be determined. The constraint may be a constraint that is characterized in arriving at a timeframe. The timeframe may be based on the estimated wakeup time of the passenger.

As an example, the vehicle may be driving a passenger to a destination. The passenger may fall asleep. As sleeping cycles are between 70 minutes to 90 minutes a timeframe of 70 to 90 minutes may be determined as the desired driving time.

It is noted that a timeframe of 70 to 90 minutes may be determined even if the fastest driving route is shorter than 70 minutes such as a driving time of 5 minutes, 10 minutes, or the like.

Upon determining a sleeping cycle, a new constraint on the arrival time may be set. The constraint may be characterized in an arrival time that is 70 to 90 minutes after the time in which the data was obtained. A wakeup time which is 90 minutes from the time in which the data was obtained may be set. A driving plan may be generated. The driving plan may comprise a wakeup time as discussed. The vehicle is driven and 90 minutes after the start time the vehicle arrives to the destination and the user may then be waked up.

In some exemplary embodiments, data about Passenger 120 may be re-obtained periodically. Upon determining that the user is awake a new driving route may be set, going directly from the current location of Passenger 120 to the destination. Additionally or alternatively, the exact sleep duration may be identified periodically to allow for a better prediction of the end time of the current sleep cycle.

In some exemplary embodiments, sleeping cycles other than 70 minutes to 90 minutes may be used. The sleeping cycles may be 60 minutes long, 50 minutes long, or the like. The duration of the sleeping cycle may be determined based on the passenger age, the passenger gender, or the like. Additionally or alternatively, crowd sourcing may be utilized to determine expected duration of a sleeping cycle of a passenger based on data of similar passengers. Additionally or alternatively, past experience with the same passenger may be used to improve predictions of the duration of her sleeping cycles over time and as additional data is gathered about her.

In some exemplary embodiments, data about Passenger 120 may be re-obtained periodically. By using an image sensor that can capture images from the cabin of Vehicle 110, it may be possible to capture images of an eye of Passenger 210. The image sensor may be configured to capture images of an eye of Passenger 210 in a fast rate such as faster than 1 image per 5 seconds, 1 image per 2 seconds, 1 image per second, 10 images per second, 60 images per second, or the like. A processor configured to process images may determine that an eye of Passenger 210 is moving faster than a predetermined threshold, so as to conclude that there's a rapid eye movement. In some exemplary embodiments, a rapid eye movement may be an eye movement of more than 50" per second, more 60" than per second, more than 70" per second, or the like. Upon determining that an eye of Passenger 120 is moving rapidly while sleeping a new wakeup time may be determined.

Additionally or alternatively, movement of Passenger 210 may be monitored during his sleep. Additionally or alternatively, sounds made by Passenger 210 while being asleep may be monitored as well. Such information may be used to determine in which stage of the sleep cycle Passenger 210 is currently, and estimate expected time for optimal wake up of Passenger 210, such as after REM duration, within a timeframe of the end of the sleeping cycle, or the like.

On Step 230, a constraint on the driving route may be determined. The constraint on the driving route may be a constraint causing the driving through the driving route to take longer than minimal required driving time. Information regarding possible routes may be obtained from a Telematic Control Unit (TCU) of Vehicle 110. The constraint may be associated with the activity of the passenger(s) or other data related thereto. The constraint may be considered as a personalized constraint, such that a different passenger would be associated with a different constraint. In some exemplary embodiments, the constraint may be traffic-agnostic, and road-agnostic.

In some exemplary embodiments, the constraint may be characterized in requirements such as allowing Passenger 120 to sleep. In such case additional requirements may be added to the constraint such as driving through roads in which the noise level and the vibration levels are estimated to be below predetermined thresholds.

In some exemplary embodiments, it may desired to allow Passenger 120 to be as long as possible inside Vehicle 110. It may be that Passenger 120 is in a conference call and is heading to an event. Depending on the event, the constraint may be that Vehicle 110 shall arrive to Destination 170 before the start time of the event, at the start time of the event or the like. In some exemplary embodiments, the constraint may be that Vehicle 110 arrives to Destination 170 within a timeframe around the start time of the event, such as at least five minutes before the event starts, at the event start time or within ten minutes thereafter, or the like.

As an example, it may take some time to walk from the drop off location in Destination 170 to the event location. Hence, the constraint may be that Vehicle 110 should arrive to the destination prior to the event start time a sufficient amount of time. For example, if the estimated walking time is 7 minutes, the constraint may be to arrive at Destination 170 at seven minutes before the event starts.

As another example, there are cultures and social situations in which it is customary to be late. For example, in Israel, it may be known that no wedding starts at the time indicated on the invitation. As another example, rock concerts may usually start later than notified. As yet another example, a celebrity invited to an event would choose to "make an entrance" after the event had already formally started. In such examples, there may be a socially acceptable timeframe after the event starts, in which the person may still arrive and participate in the event. In some exemplary embodiments, the constraint may be that Vehicle 110 arrives after the start time within the socially acceptable timeframe.

On Step 240, a driving plan is generated. The driving plan may be generated based on one or more constraints, such as the constraint generated in Step 230. In some exemplary embodiments, the driving plan may enforce the conditions set in the constraints. In some exemplary embodiments, some constraints may be hard constraints that must be held by the driving plan. Other constraints may be soft constraints that are "good to have" and if possible should be enforced by the driving plan. However, a driving plan that enforces all hard constraints may be generated and used even if some or all of the soft constraints are not held.

In some exemplary embodiments, the constraints may comprise a hard constraint such as a constraint on the time of arrival at the destination, a constraint on the drop order of the passengers, or the like. The constraints may further comprise a soft constraint on the energy usage of Vehicle 110 (e.g., fuel, gas, electricity, or the like), such as to reduce the energy consumption during the extended trip.

As an example, Passenger 120 may beheading to a flight. The disclosed subject matter may determine an estimated timeframe in which Passenger 120 should be in the airport. Hence, the constraint may be to arrive within a timeframe to the airport. While driving to the airport, it is determined that Passenger 120 is watching a movie. An end time to watching the movie may be estimated and a soft constraint that is characterized by allowing Passenger 120 to watch the movie may be set, and the driving plan may be updated accordingly.

In some exemplary embodiments, the driving plan may be a feasible driving plan determined automatically. The driving plan may also take into account available energy source of Vehicle 110, potential fueling stations and stops, potential battery recharging during the trip (e.g., solar-based recharging, kinetic energy recharging, or the like).

In some exemplary embodiments, the driving plan may comprise a driving route to take while driving. Additionally or alternatively, the driving plan may include instructions such as but not limited to the order in which Passenger 120 and Passenger 122 should be dropped off, the order in which to pick up Passenger 120 and Passenger 122 and/or goods, when to switch internal lights in Vehicle 110 on or off, when to apply the brakes in order to rock Vehicle 110 and for how long, when to play music and what music to play, when to rotate Vehicle 110 seats and to which direction, or the like.

As an example, a driving plan, intended to allow Passenger 120 to sleep while driving, may include a section in which there are actions that should be taken as Vehicle 110 is approaching Destination 170. Such actions may be play an alarm, turn on the internal lights in Vehicle 110, turn on a coffee machine and prepare coffee for Passenger 120, or the like. The driving plan may also include an extended driving route, allowing Passenger 120 a longer sleeping duration. The driving route may be a route driving through relatively quiet places, driving in the shadows, or in other conditions that would assist Passenger 120 to continue sleeping uninterrupted.

As another example, it may be estimated that Passenger 120 will start to play a video game in a specific time. In response to such determination, a time in which the cabin lights should be dimmed or turned off, so as to improve the gaming experience of Passenger 120, may be added to the driving plan. Additionally or alternatively, the driving plan may comprise an instruction to pull down the shades of Vehicle 110. Additionally or alternatively, the driving plan may comprise an instruction to change opacity of the windows in Vehicle 110, so as to shade the interior cabin. Additionally or alternatively, the seat of Passenger 120 may be rotated, preventing direct light from reaching the eyes of Passenger 120. The rotation may be based on the orientation of Vehicle 110, based on the expected location of the light source (e.g., sun), based on the surrounding buildings and their effects relating to the light (e.g., reflection from windows, shadows by towers, or the like), or the like.

On Step 250, Vehicle 110 may be driven according to the driving plan. In some exemplary embodiments, Vehicle 110 may be driven by a human driver according to the driving plan. Additionally or alternatively, Vehicle 110 may be an autonomous or semi-autonomous car, which may execute the driving plan autonomously.

In some exemplary embodiments, once Vehicle 110 is driven according to the driving plan it may be possible to periodically re-obtain the location of Vehicle 110 and to re-obtain data about the passenger(s) thereof. In response to a change in the data about the passenger(s), a different constraint may be determined and a new driving plan may be generated accordingly. As an example, assuming that the data that was obtained was that Passenger's 120 had a meeting and a constraint and a route were determined according to the meeting. In response to obtaining new data that the meeting was canceled it may be possible to identify the next meeting of Passenger 120 and to set a driving route to a different destination accordingly. Additionally or alternatively, in response to data in which Passenger 120 has no meetings within a predetermined timeframe a driving route to Passenger's 120 office may be set. As another example, the awakeness status of the Passenger 120 may change and the driving plan may be changed accordingly. Additionally or alternatively, it may be determined that Passenger 120 had stopped an activity, and based thereof, the driving plan may be altered. For example, Passenger 120 may have stopped playing a game, the person whom with Passenger 120 spoke over the phone may have hung up, or the like.

Figure 2B:
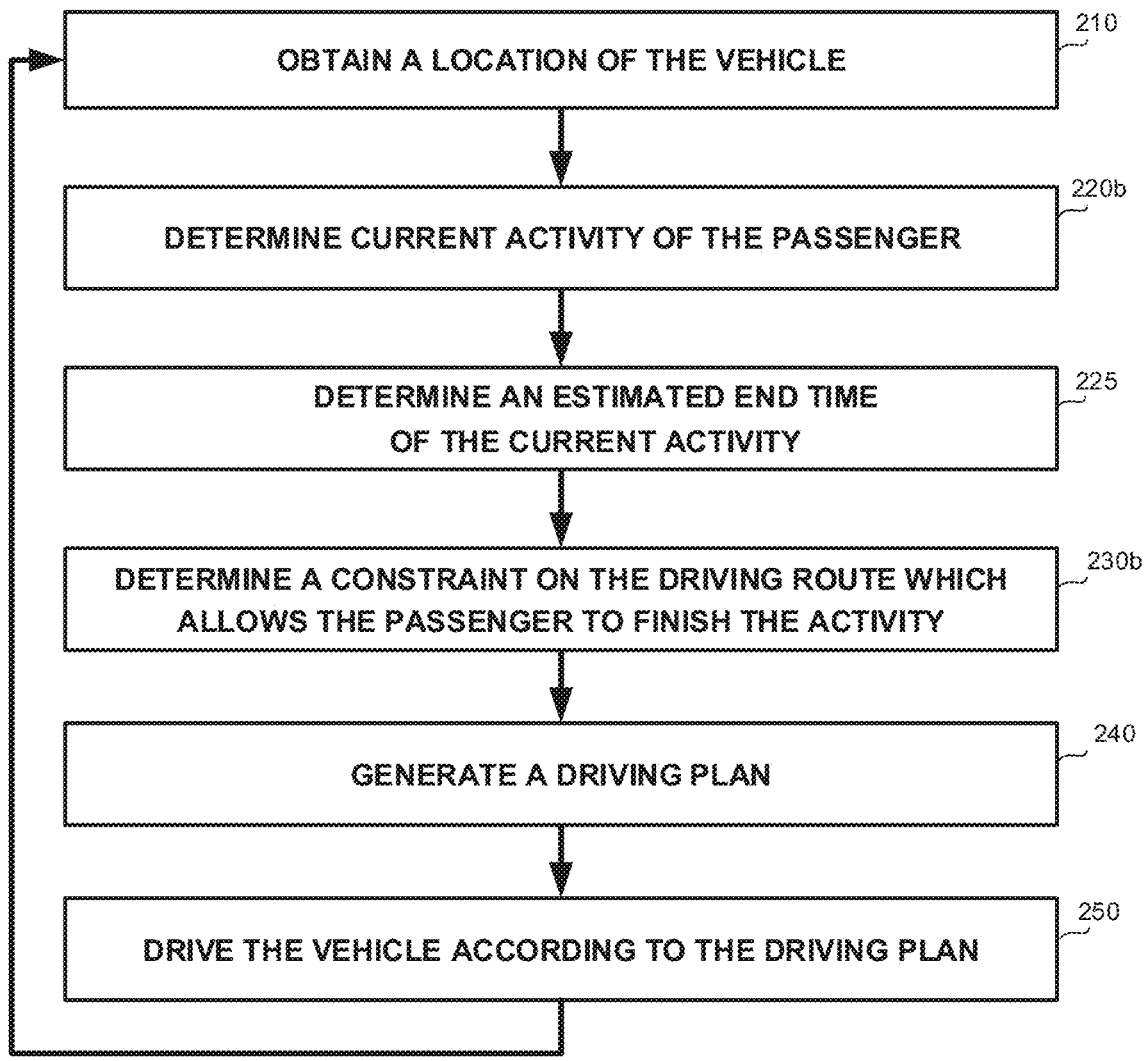

Referring now to FIG. 2B showing a flowchart diagram of a method, in accordance with some exemplary embodiments of the disclosed subject matter.

On Step 220*b*, the current activity of Passenger 120 may be determined. In some exemplary embodiments, the determination of the current activity may be performed by obtaining data about Passenger 120, as described in Step 220 of FIG. 2A. The determination may be based on input from cameras, sensors, or the like. The determination may further comprise analyzing Camera 130 raw images and information that may be available from sensors that are inside Vehicle 110. In some exemplary embodiments, a machine-learning based classifier may be applied on the raw data to predict an activity-associated label based on sensor data. The label may indicate the activity, an engagement level therein, an estimated activity duration, or the like.

As an example, Passenger's 120 seat may sense Passenger's 120 pulse and determine that he is asleep. Additionally or alternatively, external data sources such as but not limited to Passenger's 120 calendar, Passenger's 120 task list, or the like may assist in determining the current activity of Passenger 120. As another example, by using a camera it may be possible to determine that Passenger 120 is using a laptop. By reading Passenger's 120 task list and determining that he has a patent application to submit it is possible to determine that Passenger 120 is working. The activity may be activity such as but not limited to watching a video, listening to audio, engaged in a conversation, playing a game, or the like. In some exemplary embodiments, passengers may prefer to do such activities in the convenience of the vehicle, for example as inside the vehicle there may air condition, less light, comfortable seats, larger screens compared to screen of smart phones, or the like. The activity may be a virtual activity in which the passenger is virtually interacting with remote partners. Additionally or alternatively, the activity may be a physical activity in which the passenger physically engages other passengers of the same vehicle.

On Step 225, an end time of the activity may be determined. The estimated end time may be estimated using a classifier, using historic data of the passenger and other passengers conducting similar activities, based on metadata associated with the activity, or the like. As an example, in response to determining that Passenger 120 is watching a movie, movies databases may be accessed, allowing to determine in which movie Passenger 120 is watching and the duration of that movie. The estimated time in which Passenger 120 may stop watching the movie may be based on the duration of the movie and an estimated interest of Passenger 120 in the movie. Additionally or alternatively, the estimated end time of Passenger 120 playing a video game may be based on her progress in the game (e.g., close to the end) and on similar gaming sessions of the same game or similar games. Additionally or alternatively, the end time of a conference call may be determined based on a given timeslot to the conference call in the passenger's calendar. In response to determining an estimated end time of the current activity of Passenger 120, Route 150 may be chosen instead of Route 160.

In some exemplary embodiments, while estimating an end time for an activity it may be possible to calculate a timeframe corresponding to the end time. Some method may report an error percentage that may be used to calculate the timeframe. As a non-limiting example, a method for estimating sleep duration may be executed on the data that was obtained on Step 220b. The method output may be that a passenger is expected to sleep for an hour with an error of 10% yielding a timeframe of 54 to 66 minutes from the time in which the method was executed to the time in which the passenger is expected to wake up. Such a timeframe may be used by the disclosed subject matter in the following manner: In the first 56 minutes, while Passenger 122 is asleep, Vehicle 110 may be driven in areas that are relatively far away from the destination of Passenger 122. Within the timeframe, Vehicle 110 may be driven in an area that the maximum driving time from the destination of Passenger 122 is less than a predetermined threshold such as less than 10 minutes, less than 5 minutes, or the like. As an example, it may be possible to determine that the driving time of Route 150 is 50 minutes and to set Route 150 as the driving route. Additionally or alternatively, the passenger may be monitored and the timeframe may be adjusted accordingly, potentially reducing the size of the timeframe, due to better estimation and prediction to shorter timeframes. It is noted that in some cases, bio-features and facial expressions may be used to identify that a person is about to wake up, and the timeframe may be updated accordingly.

On Step 230b, a constraint on the route that allows Passenger 120 to finish the current activity may be determined. In some exemplary embodiments, the constraint may be to extend the driving route, such as prefer Route 150 over Route 160, allowing Passenger 120 to finish the activity before reaching Destination 170. In some exemplary embodiments, the constraint may be a constraint on the arrival time at the destination of Passenger 120 (e.g., arrive after the estimated end time). The outcome of applying such a constraint on a driving route may be an extended route such as Route 150 instead of Route 160.

As another example, it may be determined that Passenger 120 is heading to a meeting that has a starting time, and on top of that, it may be determined that Passenger 120 is also watching a movie within Vehicle 110. Based on such determinations, a hard constraint ensuring that Passenger 120 arrives at Destination 170 before the beginning of the meeting may be determined. Additionally or alternatively, a soft constraint ensuring that Passenger 120 is driven for a duration longer than the time needed to finish watching the movie may be determined. A driving plan generated based on such constraint (Step 240) may hold both constraints, if the time so permits. However, if only one of the constraints can be held, the hard constraint may be held and the soft constraint may be violated, resulting in Passenger 120 arriving before the meeting begins and before the movie ends.

In some exemplary embodiments, Passenger's 120 next activity and the start time of the next activity may also be determined. It may be possible to prioritize Passenger's 120 current and future activities in order to determine one or more constraints that reflects Passenger's 120 preferences. As an example, upon determining that Passenger 120 is watching a movie and upon determining the duration of the movie it may be possible to obtain data from Passenger's 120 calendar and to determine that Passenger 120 next activity start time is prior to the end time of the current activity. It may possible to determine that the next activity has higher priority and to set a constraint that is characterize in that that Passenger 120 may watch the movie for as long as possible without being late to the next activity. Arriving on time to the next activity may be a hard constraint while watching the movie for as long as possible may be a soft constraint. As another example, it may possible to determine that Passenger's 120 current activity is a conversation and that Passenger's 120 next activity's start time is not mandatory. In response to such determination it may be possible to set a hard constraint that is characterize in allowing Passenger 120 to finish the conversation while the arrival time to the next meeting may be a soft constraint.

In some exemplary embodiments, the activity of Passenger 120 may be re-evaluated and a modified constraint and driving plan may be generated accordingly. For example, the attention of Passenger 120 to a movie may decrease and as a result, it may no longer be desired to allow Passenger 120 to complete watching the movie. The relevant constraint may be removed accordingly. As another example, Passenger 120 may fall asleep while watching the movie, and the constraint of allowing Passenger 120 to complete watching the movie may be replaced by a constraint allowing Passenger 120 to complete a sleep cycle.

Figure 2C:
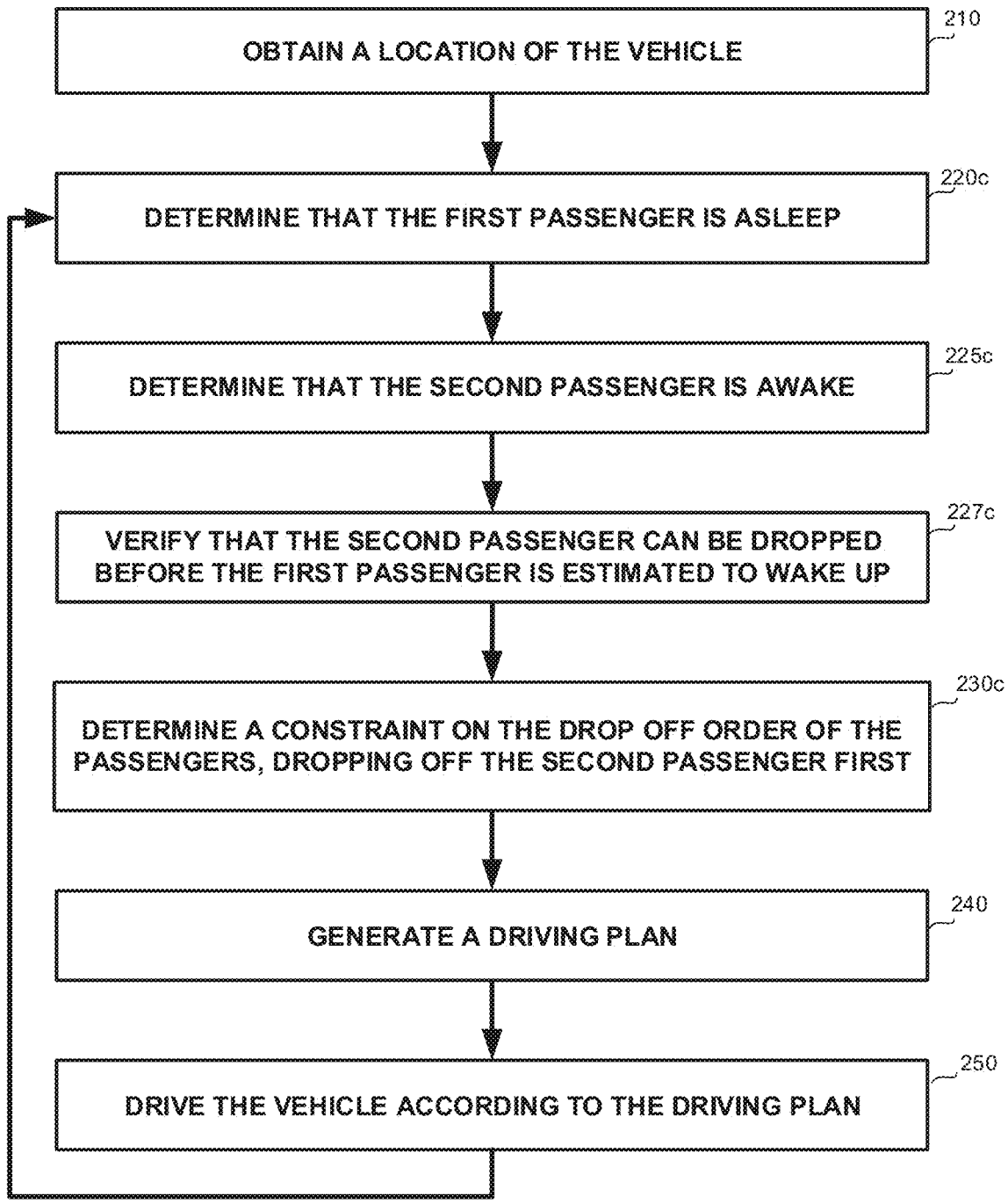

Referring now to FIG. 2C showing a flowchart diagram of a method, in accordance with some exemplary embodiments of the disclosed subject matter.

In some exemplary embodiments, it may be that the drop-off location for Passenger 120 may be closer than that of Passenger 122. In accordance with some exemplary embodiments of the disclosed subject matter, nonetheless, Passenger 122 may be dropped off first, due to the fact that Passenger 120 is sleeping. Additionally or alternatively, the same may be applied for other activities other than sleeping, such as watching a movie, conducting a conference call, or the like.

On Step 220c, Passenger's 120 awakeness status may be determined. The determination may be based on data about Passenger 120 that is obtained as in Step 220 of FIG. 2A. It may be possible to analyze the data, similarly as in Step 220b of FIG. 2B and to determine that Passenger 120 is asleep. In some exemplary embodiments, an estimated sleeping time may be determined. The estimated sleeping time may be based on the current time of day, a sleep history of Passenger 120, tiredness level of Passenger 120, or the like.

In some exemplary embodiments, the tiredness level may be indicated by a number between 0 and 1. The tiredness level may be determined based on the sleep history of Passenger 120, based on usage of Passenger 120 of online storage account (e.g. DROPBOX™), or the like. For example, due to the usage of the online account at night, it may be determined that Passenger 120 was not asleep during the night and that he is potentially very tired.

On Step 225c, the awakeness status of Passenger 122 may be determined. The determination process may be similar to the determination process that is in Step 220c. It may be possible to determine that Passenger 122 is awake.

On Step 227c, it is verified that Passenger 122 may be dropped off before Passenger 120 is estimated to wake up. Said verification may be based on the data that was obtained on Steps 210, 220c, 225c. As a non-limiting example, the estimated wakeup time of the Passenger 120, denoted as $t_1$, may be computed by a controller using the formula: $t_1=t_0+$ sleep_duration, where $t_0$ may be the current time, e.g., the time in which Step 220c, 225c and 227c are being executed by the disclosed subject matter, and sleep_duration may be an estimated sleep duration of Passenger 120, such as determined in Step 220c. The drop time of Passenger 122, denoted as $t_2$, may be computed by the formula $t_2=t_0+$ driving_time where driving_time is the estimated driving time the current location of Vehicle 110 to the drop-off destination of Passenger 122. In some exemplary embodiments, in Step 227c, it may be verified that $t_2<t_1$, or that sleep_duration<driving_time.

On Step 230c, a constraint on the route may be determined. The constraint may set a drop-off order between the Passenger 120 and Passenger 122. In some exemplary embodiments, the constraint may be that Second Passenger's 122 should be dropped before Passenger 120. Additionally or alternatively, the constraint may be to first reach the destination of Passenger 122. For example, $ETA_i$ may indicate an Estimated Time of Arrival (ETA) of passenger i. The constraint may be $ETA_1>ETA_2$, where $ETA_1$ is the ETA of Passenger 120 and $ETA_2$ is the ETA of Passenger 122.

In some exemplary embodiments, additional constraints may also be set, such as for example, constraints relating to the fact that Passenger 120 is asleep and wishing to avoid waking him up.

As an example, referring again to FIG. 1B. Passenger 124 may be an infant, who is the child the adult, Passenger 126. Although Passenger 124 and Passenger 126 may have the same destination, the drop off order may still be different and instead of being dropped off at the same time, Passenger 126 may be dropped before Passenger 124, due to the infant being asleep when Passenger 126 is dropped off.

As another example, Vehicle 110 may be used for ridesharing. Passenger 120 may be driven using Vehicle 110. Passenger 120 may be wearing Smart Bracelet 136 of FIG. 1A. Smart Bracelet 136 may monitor the sleeping periods of Passenger 120 and save the data on a remote cloud server, on the Passenger's 120 smartphone, or the like. The disclosed subject matter may access, as an example, Passenger's 120 smartphone and determine that first passenger may sleep everyday between 14:00 to 16:00. At 15:00 Passenger 122 may join the shared ride with Passenger 120. Passenger's 122 destination may be a half hour drive away from the current destination of Vehicle 110 while Passenger's 120 destination may be 45 minutes away from Vehicle's 110 current location. It may be verified that Passenger 122 may be dropped before Passenger 120 resulting in allowing Passenger 120 can continue to sleep instead of being dropped first, forcing him to wake up.

In some exemplary embodiments, Vehicle 110 may transport goods. Instead of dropping off Passenger 120 first before dropping of the goods, if Passenger 120 is determined to be asleep (220c), the goods may be dropped off first. In some exemplary embodiments, in case Passenger 120 is asleep, and the estimated sleep duration is long enough for a transportation task to be completed in full, Vehicle 110 may pick up the goods, drop the goods off, and only then drop off Passenger 110.

Figure 2D:
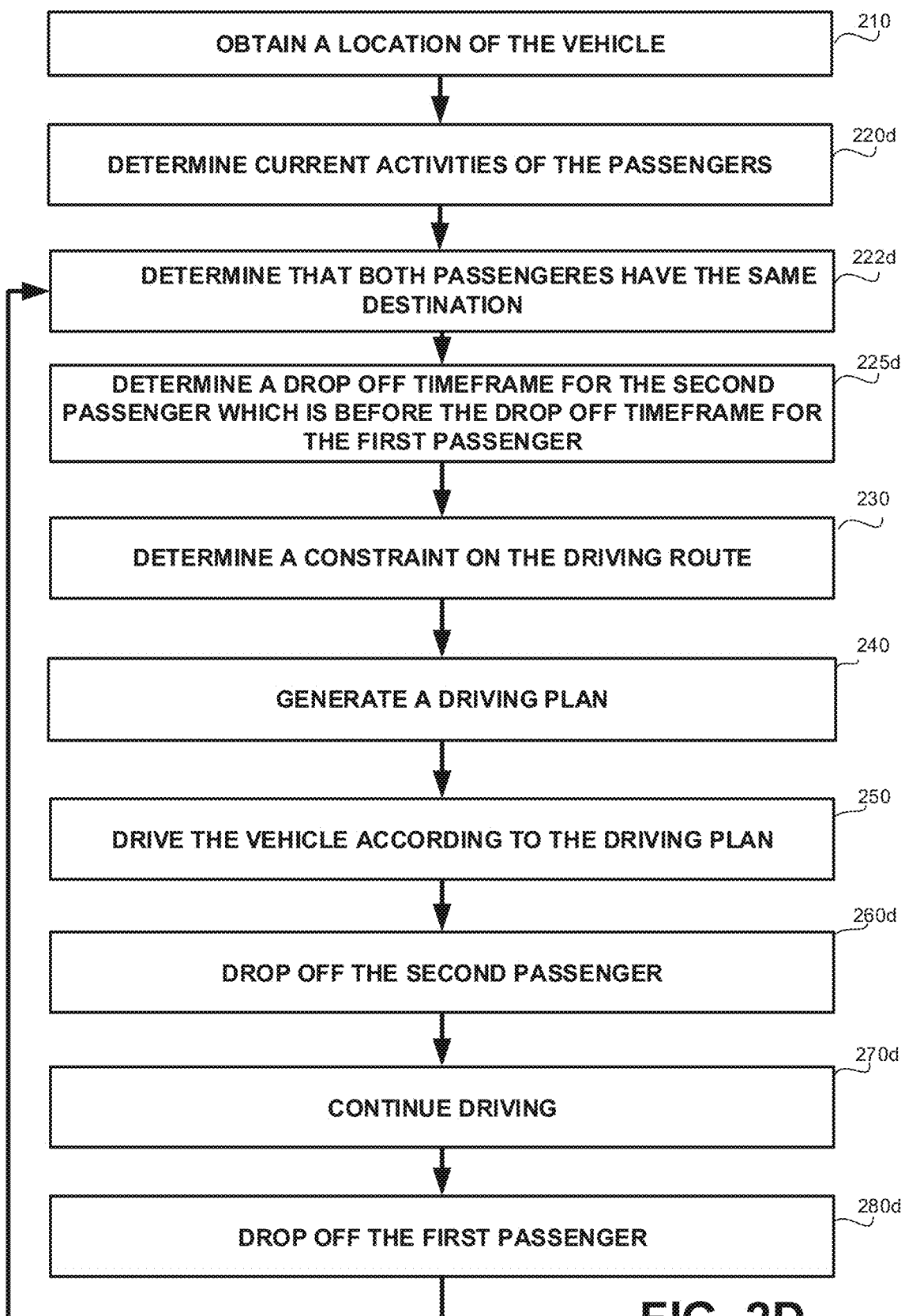

Referring now to FIG. 2D showing a flowchart diagram of a method, in accordance with some exemplary embodiments of the disclosed subject matter.

On Step 220d, the current activities of the passengers, such as Passenger 120 and Passenger 122, are determined. In some exemplary embodiments, Step 220d may be repeated for each passenger. As an example, Camera 130 may be used in order to capture images of one passenger at a time, allowing a machine learning algorithm to analyze the captured images and determine an activity of each passenger. As another example, the disclosed subject matter may iterate over the smart phones of the passengers, their wearable devices (e.g., Smart Bracelets 136 of FIG. 1A), or the like in order to determine each the activity of each passenger.

On Step 222d it is determined that both Passengers 120, 122 have the same destination. In some exemplary embodiments, there may be different ways to express the same destination. As an example, NBC Studios, Rockefeller Center Observation Deck and 30 Rockefeller Plaza may all refer to the same location. Passengers 120 and/or Passenger 122 may be using a mobile application, a web site, or the like in order to use Vehicle 110 and may enter different titles as destinations, meaning the same destination. In such cases, the disclosed subject matter may refer to such titles as if the Passenger 120, 122 are heading to the same destination.

On Step 225d, drop-off timeframes of the passengers may be determined. In some exemplary embodiments, a first timeframe of a first passenger (e.g., Passenger 120) may be based on an estimated duration of the current activity of the first passenger. The second timeframe may be based on the duration of the second activity of the second passenger. Each timeframe may be defined based on a desired ETA to the destination, such as dictated by the passenger explicitly, implicitly deduced from her calendar, or the like. Additionally or alternatively, each timeframe may take into account the current activity of the relevant passenger and, if the activity must not be interrupted, the timeframe may commence at a time where the activity is estimated or known to end. For example, one passenger may be asleep and the other may be awake. A drop off timeframe of the sleeping passenger may be on about the time the sleeping passenger is expected to wake up (e.g., not before the earliest estimated wake up time, and up to no more than a predetermined duration after the latest estimated wake up time). As the other passenger may have no associated limitations, his drop off timeframe may be earlier than that of the sleeping passenger. Hence, the drop off timeframe of the passenger who is awake is before the drop off timeframe of the sleeping passenger, and although both have the same destination.

Based on the drop off timeframes, the constraint of Step 230 may be determined, and a driving plan may be generated accordingly on Step 240.

On Step 260d, the second passenger (e.g. Passenger 122) is dropped off at the shared destination. The first passenger (e.g., Passenger 120) may remain in Vehicle 110 and may continue his activity. Although the first passenger may have the same destination as the second passenger, the first passenger may prefer to remain in Vehicle 110 and conclude his activity. In some exemplary embodiments, the first passenger may be an infant such as Passenger 124 of FIG. 1B, and the second passenger may be his guardian, such as Passenger 126 of FIG. 1B. Upon reaching to the destination of both passengers, only one of which—the second passenger—may be dropped off. The first passenger (e.g., Passenger 124) may remain in Vehicle 110 to complete his activity (e.g., nap time).

On Step 270d, Vehicle 110 may continue driving, having the first passenger onboard. Vehicle 110 may have a driving plan in which there is a timeframe for dropping off the first passenger. In some exemplary embodiments, until the time for dropping of the first passenger arrives, Vehicle 110 may continue driving, pick up additional passengers, delivering goods, or the like. Additionally or alternatively, it may be decided to park Vehicle 110 until the first passenger finishes his current activity. Vehicle 110 may connect to databases regarding parking lots in order to find the most optimal place to park. The optimal place to park may be the cheapest parking lot, the nearest parking lot, a parking lot that will would not interfere with the current activity of the first passenger, a combination thereof, or the like.

On Step 280d, Vehicle 110 may reach the destination once more, and the first passenger may be dropped off.

Figure 2E:
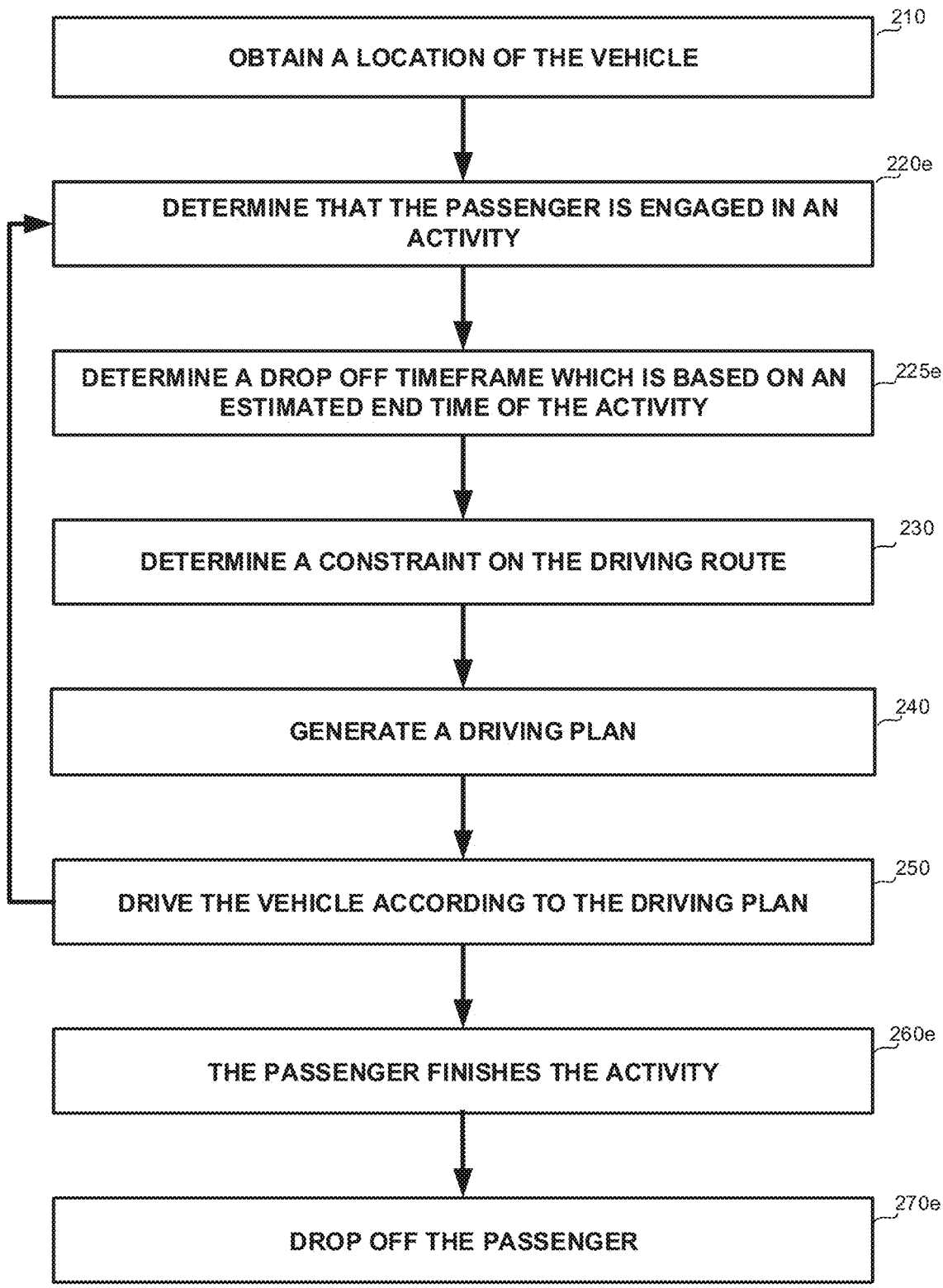

Referring now to FIG. 2E showing a flowchart diagram of a method, in accordance with some exemplary embodiments of the subject matter.

On Step 220e, it is determined that Passenger 120 is engaged in an activity. The determination process may be similar to the determination process of Step 220b of FIG. 2B.

On Step 225e, a drop off timeframe of Passenger 120 may be determined. The drop off timeframe may be based on an estimated end time of the current activity of Passenger 120. The determination may be similar to the determination of Step 225d of FIG. 2D. In some exemplary embodiments, the drop off timeframe may be determined to be at the estimated end time of the current activity or within a predetermined time thereafter. For example, the drop off time may be within a following timeframe: [ET, ET+TR], where ET is the estimated end time of the activity and TR is a time range. Each passenger may be associated with a different time range, such as defined based on his preferences. For example, one passenger may pay a higher fee, and may be allowed to set his time range to be no more than 2 minutes, while for a cheaper rate, a second passenger may accept a time range of 10 minutes.

Based on the drop off timeframe of Step 225e, a constraint may be determined (230). The constraint may be, for example, ET≤ETA≤ET+TR, where ET and TR is as explained above and ETA is the estimated arrival time of the passenger.

While the vehicle is driving (250), Steps 220e, 225e, 230-250 may be re-performed. In some cases, the estimated end time of the current activity may change and the driving plan may change accordingly.

On Step 260e, Passenger 120 finishes his current activity. The determination that Passenger 120 has finished his current activity may be similar to that of Step 220e when the current activity of Passenger 120 was determined. As an example, on Step 220e, by using Camera 130 raw images and image processing it was determined that Passenger 120 is eating. Similarly, by using Camera 130 raw images and images processing it may be possible to determine that Passenger 120 has finished to eat.

On Step 270e, Passenger 120 is dropped off Vehicle 110 may approach Passenger's 120 destination as Passenger 120 is about to finish his current activity in order to synchronize the end of the current activity with arrival to Passenger's 120 drop-off destination.

Figure 2F:
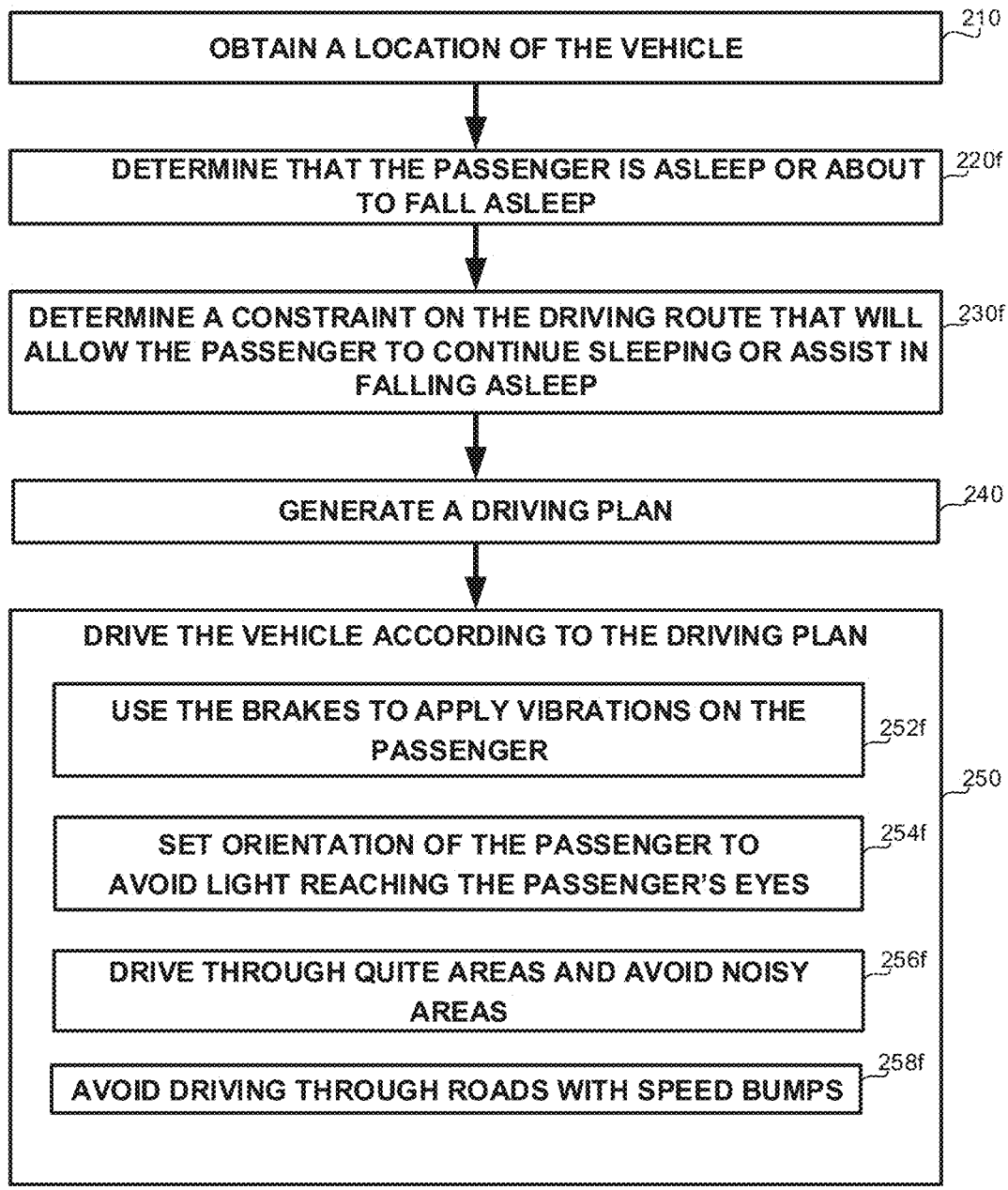

Referring now to FIG. 2F showing a flowchart diagram of a method, in accordance with some exemplary embodiments of the subject matter.

On Step 220f, it may be determined that Passenger 120 is asleep. Additionally or alternatively, it may be determined that Passenger 122 is about to fall asleep. The determination may be similar to Step 220b of FIG. 2B. In some exemplary embodiments, it may be possible to determine that the Passenger 120 is about to fall asleep by processing images of the Passenger's 120 eyes. In some exemplary embodiments, determining that Passenger 120 is predicted to fall asleep within in a timeframe, such as within no more than about five minutes, about ten minutes, or the like, may be considered as determining that Passenger 120 is about to fall asleep. Additionally or alternatively, the determination that Passenger 120 is about to fall asleep may rely on estimating the tiredness level of Passenger 120 as in Step 220c of FIG. 2C and determining that the tiredness level is above a predefined threshold such as but not limited to a tiredness level that is above about 0.8, 0.9, or the like.

In some exemplary embodiments, it may be determined that Passenger 120 needs to sleep. In some cases, a guardian of Passenger 120, such as in case of an infant, the infant's parent, may decide that Passenger 120 should be put to sleep. The guardian, who may or may not ride the vehicle, may instruct the vehicle or a controller thereof, to put the passenger to sleep. Additionally or alternatively, an automated determination that Passenger 120 needs to sleep may be performed. Such determination may be based on a sleep history, based on inferred activity of Passenger 120 based on external sources, such as online storage services, or the like. In some exemplary embodiments, it may be automatically determined that Passenger 120 can fall asleep without being interrupted and without missing any planned activity. For example, the calendar of Passenger 120 may be accessed to determine that Passenger 120 is free to sleep during the ride (e.g., Passenger 120 has no upcoming call conferences while he is being driven). Hence, it may be determined to assist Passenger 120 to fall asleep.

On Step 230*f* a constraint on the driving route that will allow Passenger 120 to continue sleeping may be determined. Additionally or alternatively, a constraint on the driving route that may assist Passenger 120 to fall asleep may be determined. The constraint may comprise extending the route, setting Passenger's 120 orientation with respect to a light source in order to avoid light directly reaching the eyes of the passenger, a combination thereof, or the like. In some exemplary embodiments, it may be possible to assist the passenger to fall asleep by applying micro steering of the vehicle, by rocking the passenger in his chair, or the like.

In some exemplary embodiments, the constraint may be a constraint enforcing a driving route that is suitable for sleeping. A driving route that is suitable for sleeping may be a route that avoids speed bumps, a route that avoids areas having an expected noise level that is above a predetermined threshold, preferring routes in shades of buildings, a combination thereof, or the like. In some exemplary embodiments, the constraint configured to allow the passenger to sleep or to fall asleep may be a soft constraint.

On Step 252*f*, the breaks of Vehicle 110 may be used in order to apply vibrations on Passenger 120. In some exemplary embodiments, vibrations that are below a predetermined threshold may assist Passenger 120 to fall asleep. Additionally or alternatively, micro-braking operations may be performed to cause vibrations of Vehicle 110. Additionally or alternatively, the seat of the passenger may be vibrated independently of the vehicle, such as using an oscillator. Additionally or alternatively, micro steering operations may be used to gently tilt the passenger, i.e., frequent steering operations in opposite directions and within a small range, such as between about −5 degrees and +5 degrees, between about −3 degrees and about +3 degrees, between about −1 degree and +1 degree, or the like. In some exemplary embodiments, frequent steering operations may be operations performed within a frequency below about 5 seconds, below about 3 seconds, below about 1 second, or the like.

On Step 254*f*, Passenger 120 orientation is set with respect to a light source in order to avoid light directly reaching the eyes of Passenger 120. The orientation of Passenger 120 may change absolutely or relatively with respect to Vehicle 110. In some exemplary embodiments, changing the orientation of Passenger 120 in an absolute manner may be implemented by changing the orientation of Vehicle 110 as a whole. In some cases, different routes may yield different orientations with respect to the sun, or other artificial light sources. Hence, different routes may be selected to reduce to light intensity that reaches the eyes of Passenger 120 or even avoid it altogether. Additionally or alternatively, the orientation of Passenger 120 may be changed relatively with respect to Vehicle 110, such as by rotating the seat of Passenger 120. In some exemplary embodiments, the seats in Vehicle 110 may be rotatable seats. Additionally or alternatively, it may be possible to change the angle of the seat's backrest. The direction and illumination level of the light source may be determined by using an optical sensor. Additionally or alternatively, Camera 130 may be used in order to capture images of Passenger's 120 eyes. A microcontroller may process the images and determine that Passenger 120 is blinded by the light source. In response to determining that Passenger 120 is blinded by the light source, the seat of Passenger 120 may be rotated. Additionally or alternatively, the angle of Passenger's 120 seat's backrest may be changed.

Additionally or alternatively, in response to determining that Passenger 120 is blinded by the light source it may be possible to change the orientation of Vehicle 110, causing Passenger 120 orientation to change.

Additionally or alternatively, in some cases the route may be selected so as to pass nearby tall obstacles that provide a shadow from a light source, such as the sun or artificial light source. For example. Vehicle 110 may be driven in a valley that is shaded by a mountain, in order to avoid sunlight. As another example, a route passing nearby skyscrapers may be preferred over a route in which no buildings cast shadows, and therefore is more illuminated.

On Step 256*f*, Vehicle's 110 is driven through quiet areas and avoid noisy areas. Such areas may be areas in which the noise level is below a predetermined threshold. The noise level may be determined as the noise level that is measured inside the cabin of Vehicle 110. In some exemplary embodiments, the sound level inside Vehicle 110 may be measured using a microphone. In some exemplary embodiments, a predicted noise level may be based on crowd-sourced information, such as obtained from other vehicles that passed in the same area in the past. The predicted sound level may be predicted using statistical predictions, using machine learning classifiers, or the like. The predicted sound level may be based on the expected travel time in the area. For example, during rush hour and other high traffic times, the expected sound level may be higher than normal.

On Step 258*f*, Vehicle 110 avoids driving through roads with speed bumps. In some exemplary embodiments, it may be desired to drive through roads that have no speed bumps. Additionally or alternatively, a route with the minimal number of speed bumps may be chosen as the driving route. Additionally or alternatively, Vehicle 110 may use Camera 130 in order to read warning signs regarding speed bumps, speed limit signs, or the like and slow down prior to reaching a speed bump. Additionally or alternatively, Vehicle 110 may slow down to a speeding drive in which driving on speed bump may not have any effect on Passenger 120. In some exemplary embodiments, the size of the speed bumps may vary. Additionally or alternatively, the speed in which Vehicle 110 reaches a speed bump may be recorder. While driving on a speed bump, Vehicle 110 may use information from sensors such as an accelerometer in order to determine the impact of driving on a speed bump on Passenger 120. In case that the impact was above a predetermined threshold it may be determined to drive in a speed that is below the speed that was recorded.

It is noted that steps 252*f*, 254*f*, 256*f* and 258*f* or any subset thereof may be performed in parallel or at any order regardless of the order that may be imposed by the numeric order. It is further noted that steps 252*f*, 254*f*, 256*f* and 258*f*, or any subset thereof may be performed more than once.

Figure 3:
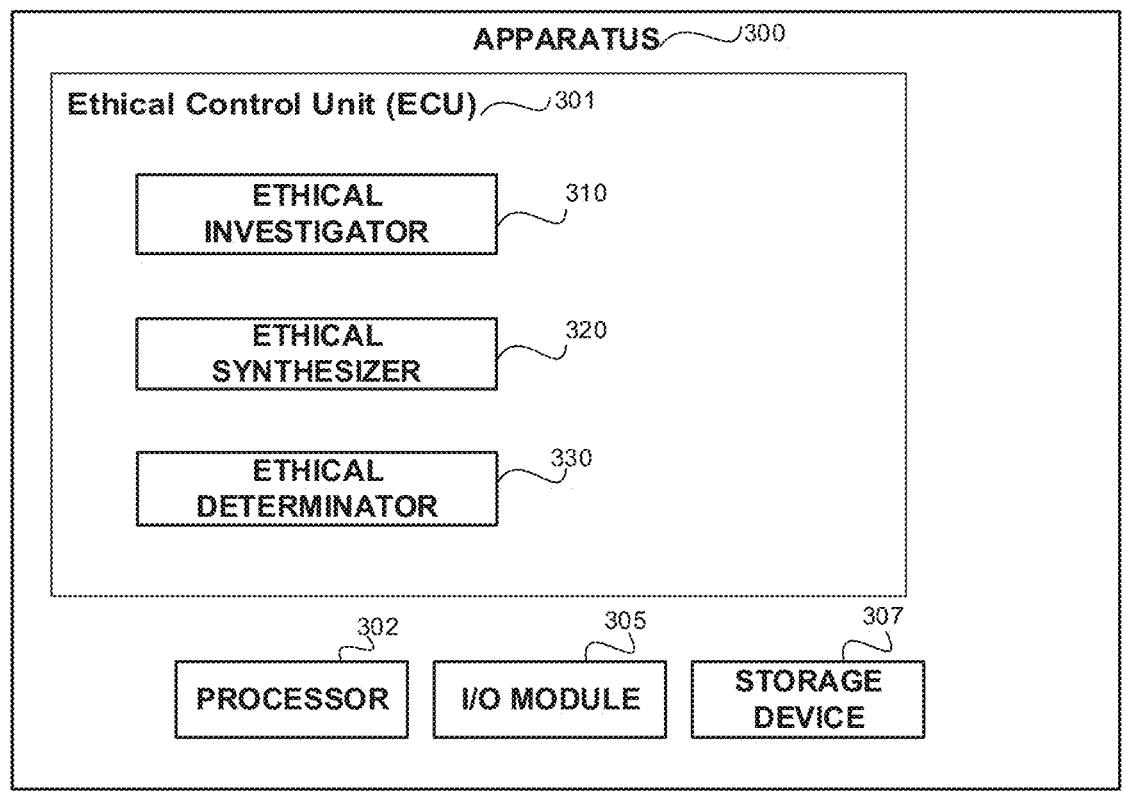
FIG. 3 shows an apparatus, in accordance with some exemplary embodiments of the subject matter.

Referring now to FIG. 3 showing an apparatus in which the disclosed subject matter is used, in accordance with some exemplary embodiments of the subject matter. In some exemplary embodiments, Apparatus 300 may be part of, or comprised by a vehicle, such as Vehicle 110. Additionally or alternatively, Apparatus 300 may be a navigation controller of Vehicle 110, an autonomous driving system of Vehicle 110, or the like. Additionally or alternatively, Apparatus 300 may be a remote device connected to Vehicle 110, or the like.

In some exemplary embodiments, Apparatus 300 may comprise Processor 302. Processor 302 may be a Central Processing Unit (CPU), a microprocessor, an electronic circuit, an Integrated Circuit (IC) or the like. Processor 302 may be utilized to perform computations required by the Apparatus 300 or any of it subcomponents. In some exemplary embodiments, Processor 302 may be configured to perform any of the methods depicted in FIGS. 4-6.

In some exemplary embodiments of the disclosed subject matter, Apparatus 300 may comprise an Input/Output (I/O) Module 305. I/O Module 305 may be utilized to provide an output to and receive input from Passenger 120 of FIG. 1A. In some exemplary embodiments, I/O Module 305 may be connected to the Controller Area Network (CAN) of Vehicle 110. Additionally or alternatively, I/O Module 305 may output to and receive inputs from other computerized devices that are in Vehicle 110. In some exemplary embodiments, I/O Module 305 may be utilized to connect Apparatus 300 to a computerized network, such as the Internet, a wireless network, or the like.

In some exemplary embodiments, Apparatus 300 may comprise a Storage Device 307. Storage Device 307 may be a hard disk drive, a Flash disk, a Random Access Memory (RAM), a memory chip, or the like. In some exemplary embodiments, the Storage Device 307 may retain program code operative to cause the Processor 302 to perform acts associated with any of the subcomponents of the Apparatus 300.

Apparatus 300 may comprise an Ethical Control Unit (ECU) 301. ECU 301 may be connected to a CAN in Vehicle 110, or otherwise be in communication with a driving module driving Vehicle 110. In some exemplary embodiments. ECU 301 may be implemented in hardware, software, combination thereof, or the like. In some exemplary embodiments, in case that Vehicle 110 is an autonomous vehicle and in case of an impending accident, a decision regarding the actions of Vehicle 110 may be taken. Such decision may be affected by ethical considerations that may be provided by the ECU 301. For example, there may be pedestrians in the surroundings of Vehicle 110 and deviation may cause harm to the pedestrians. The decision may be a decision such as but not limited to whether to deviate and hit a number of pedestrians or whether to break and not deviate, causing the impending accident.

Ethical Investigator 310 may be configured to present questions to a person, such as a passenger, an owner of the vehicle, an insurance company insuring the vehicle against accidents, or any other entity who may have authority of the vehicle's actions. The entity may provide answers to Ethical Investigator 310.

In some exemplary embodiments, Ethical Investigator 310 may be external to Vehicle 110. Ethical Investigator 310 may have a user interface such as but limited to a web page, a mobile application, a chat bot, a human agent, or the like. In some exemplary embodiments, Ethical Investigator 310 may be configured to investigate the entity prior to the vehicle commencing its journey.

ECU 301 may comprise Ethical Synthesizer 320. Ethical Synthesizer 320 may be executed on a cloud server with a database and may be connected to Vehicle 110. Additionally or alternatively, Ethical Synthesizer 320 may be executed locally within Vehicle 110. In some exemplary embodiments, Ethical Synthesizer 320 may receive the questions and answers from Ethical Investigator 310. Ethical Synthesizer 320 may synthesize ethical preferences based on the answers provided to the ethical questions. The ethical preferences may be useful to make ethical decisions, such as in case of an impending accident. The ethical preferences may be retained in a database. The ethical preferences may be retained together with a unique identifier of the entity providing the answers to the ethical questions. The unique identifier may be utilized to retrieve the relevant ethical preferences of the authority controlling a vehicle at a certain time. For example, when the vehicle is controlled by a passenger, the passenger's preferences may be retrieved and used, whereas when passenger disembarks and a different passenger takes control over vehicle, her preferences may be retrieved and utilized. In some exemplary embodiments, the controlling entity may not be riding the vehicle. For example, different companies may be sharing the vehicle and using it in different timeslots. Each company may have different ethical preferences that may be applied in the different timeslots, respectively.

In some exemplary embodiments, Ethical Determinator 330 may be configured to make an ethical decision to prefer one possible outcome over another. In some exemplary embodiments, in a given scenario, two alternative outcomes may be identified. In some exemplary embodiments, Ethical Determinator 330 may make an ethical decision and choose a preferred outcome. Additionally or alternatively, the ethical decision may be performed only in cases where there are several alternatives that are not Pareto improvements of the others. An alternative outcome may be considered a Pareto improvement of another alternative outcome, if it has at least one improved preference criterion without making any other preference criterion worse off. For example, if in both alternative outcomes, there is an accident involving harming human life, Ethical Determinator 330 may be utilized to determine which of the two outcomes is preferred. As another example, if in one alternative outcome there is an accident, and in the other, there is no accident, and in all ethical preferences criterion the situation of the second outcome is not worse off with respect to the first ethical preference criterion, then the second outcome may be considered as a Pareto improvement over the first outcome, and the decision between the two outcomes may not involve an ethical decision.

In some exemplary embodiments, Ethical Determinator 330 may receive the alternative outcomes from a driving module predicting potential outcomes. Additionally or alternatively, Ethical Determinator 330 may receive data such as but not limited to images of Vehicle 110 surroundings, Vehicle 110 velocity, or the like, from which the potential outcomes may be determined.

In some exemplary embodiments, Ethical Determinator 330 may be deployed on a remote cloud server, remote from the vehicle. Additionally or alternatively, Ethical Determinator 330 may be deployed and executed within the vehicle.

As a non-limiting example, Camera 130 may identify that Passenger 120 is entering Vehicle 110. In response to such determination Camera 130 may take a photo of Passenger 120 and facial recognition may be utilized to identify the identity of Passenger 120. Based on her identity, a unique identifier may be retrieved and it may be determined whether or not an ethical preference of Passenger 120 exists. In case no such ethical preference was previously retained. Ethical Investigator 310 may initiate an ethical investigation. Ethical Investigator 310 may present Passenger 120 an ethical questioner. The ethical questioner may comprise questions from which the ethical preferences of Passenger 120 may be deduced. The questions may present ethical dilemmas explicitly or implicitly. The questions may be questions such as but not limited to "whom would you visit first in a hospital, an aged woman or a child?", "what makes you sadder, watching a lonely old man or a little girl crying?", "would you rather die than kill a child?", "would you prefer to run over a cat or cause property damage?", "would you rather hit a wall or run over a dog?", or the like. In some exemplary embodiments, Ethical Synthesizer 320 may receive the answers of Passenger 120 and synthesize an ethical preference of Passenger 120 based thereon. The ethical preference may be utilized as long as Passenger 120 is controlling the vehicle, and her preferences may be deemed as the active ethical preferences.

In some exemplary embodiments, both Passenger 120 and Passenger 122 may be in Vehicle 110. Ethical Synthesizer 320 may synthesize a joint ethical preferences for both passengers and use the joint ethical preferences as the active ethical preferences. As an example, in response to the question "do you love children?", Passenger 120 may have answered "very much" while Passenger 122 may have been indifferent. Ethical Synthesizer 320 may access the database, and query the index that corresponds to Passenger 120 and the index that corresponds to Passenger 122. After querying the database, Ethical Synthesizer 320 may retrieve the ethical preferences of Passenger 120 and Passenger 122. Ethical Synthesizer 320 may synthesize the ethical preferences of Passenger 120 and the ethical preferences of Passenger 122 into a joint ethical preferences and decide that Vehicle 110 should avoid hitting children in case of an accident.

In some exemplary embodiments, Ethical Synthesizer 320 may be implemented using a distributed system such as but not limited to blockchain. Passengers may have ethical wallets, retaining their ethical preferences. In some exemplary embodiments, the ethical wallets may be retained on a cold device that is connected to a computerized device or network only upon demand. For example, the passengers may carry a USB stick retaining the information and plug the USB stick to the vehicle when they want to enforce their preferences.

In some exemplary embodiments, upon a detection of an impending accident, Ethical Determinator 330 may be invoked to apply the active ethical preferences. In some exemplary embodiments, Ethical Determinator 330 may be utilized to determine a preferred outcome, based on the active ethical preferences. A corresponding action to be taken by the vehicle to cause the preferred outcome may be taken. The action may be an action such as but not limited to, deviate to the right, deviate to the left, brake, accelerate, a combination thereof, or the like.

It is noted that in case of impending accident there may be many variables. The surrounding of the road, the passengers, and the people that may be hit as a result of the impending accident, or the like. It may be that in order to cover all the potential cases, a person may be asked a large number of questions (e.g., over 100 questions or even over 1000 questions). Such large number of questions may relate to each potential comparison between alternative outcomes. However, a person may have a hard time answering a large number of questions. Instead, Ethical Investigator 310 may limit itself to a relatively small number of questions (e.g., about 5 questions, about 10 questions, or the like), and the answers thereto may be used to synthesize an ethical preferences. Additionally or alternatively, the passenger may be presented with several questions each time she embarks a vehicle, thereby improving the ethical preferences each time. Additionally or alternatively, the questioner may be dynamic and the questions may be selected based on the answers of the passenger to previous questions. Additionally or alternatively, ethical preferences may be predicted based on similar entities who provided similar answers and have similar characteristics as the passenger, such as similar demographic characteristic, similar occupation, similar business, or the like.

In some exemplary embodiments, reinforcement of synthesized ethical preferences may be performed by asking the passenger questions and comparing her answers with predicted preferred outcome using the ethical preferences. Additionally or alternatively, in case of an accident, after the actual outcome may have occurred, the entity may be presented with a question relating thereto. In some cases, the actual outcome and another potential outcome that was averted may be disclosed to the entity, and it may be investigated whether the entity affirms the selected outcome or not.

In some exemplary embodiments, Ethical Determinator 330 may make the determination based on the characteristics of the different potentially affected beings or objects. Consider a case where one potential outcome is running over a teenager, whereas the other is running over an adult female. The determination of a preferred outcome may differ if the teenager's behavior. In one scenario, the teenager may be an innocent bystander, while in another scenario, the teenager may be acting recklessly and running into the road. The decision may, therefore, be different in both scenarios.

In some exemplary embodiments, a default configuration may be defined for Ethical Determinator 330. An initial configuration may be used when an active ethical preference is not available. For example, if Ethical Investigator 310 did not complete investigation of the preferences of the controlling entity, an active ethical preferences may not be available. Additionally or alternatively, in case that the ethical preferences of the controlling entity cannot be retrieved due to a technical malfunction or loss of connectivity, the active ethical preferences may not be used. Instead, a default configuration may be used. In some exemplary embodiments, the default configuration may be set by a manufacturer of the vehicle, by the owner of the vehicle, or the like. Additionally or alternatively, the default configuration may be configured to make random choices.

Figure 4:
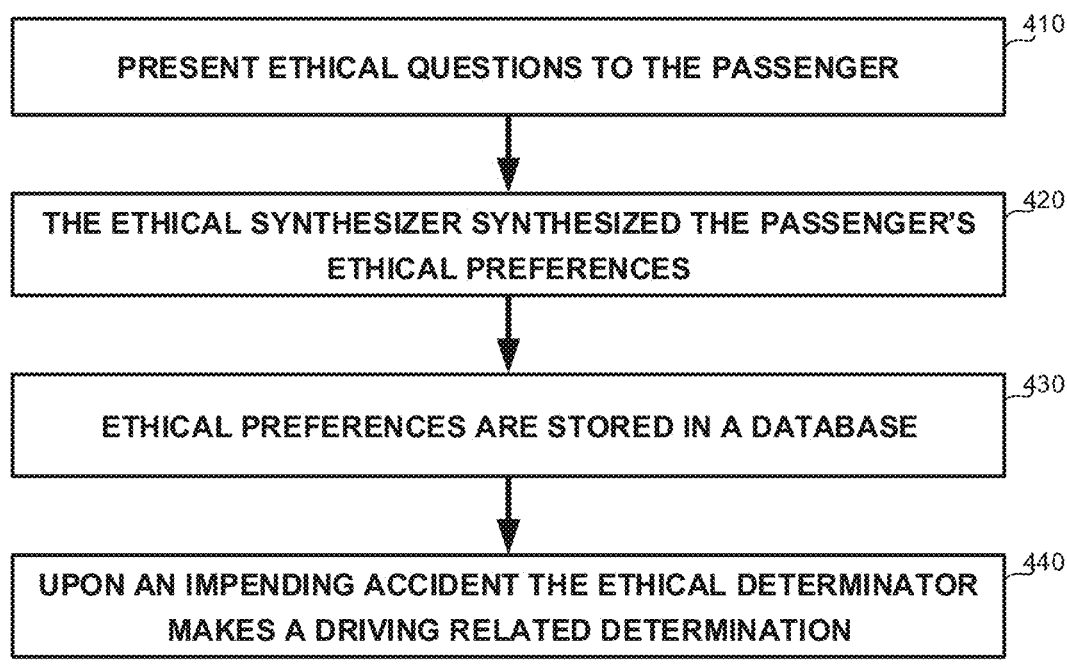
FIGS. 4-6 show flowchart diagrams of methods, in accordance with some exemplary embodiments of the disclosed subject matter.

Referring now to FIG. 4 showing a flowchart diagram of a method, in accordance with some exemplary embodiments of the disclosed subject matter.

On Step 410, ethical questions are presented to the passenger. Additionally or alternatively, the ethical question may be presented to the car owner, to the controlling entity, to the guardian of the passenger, or the like. The ethical questions may be presented by Ethical Investigator 310 of FIG. 3. The question may be stored on a cloud server, on a storage device inside Vehicle 110, or the like. As an example, there may be a set of ethical question that may allow to deduce the importance of traffic rules to the investigated party, the preferred outcome between potential alternative outcomes, or the like.

On Step 420, the ethical synthesizer, such as Ethical Synthesizer 320 of FIG. 3, may synthesize the ethical preferences of the investigated party based on the answers provided thereto. The ethical synthesizer may synthesize a preference function that can be used to determine a preferred outcome between two potential outcomes. For example, the function IsBetter(A, B), having two parameters: A and B, each representing a different potential outcome.

In some exemplary embodiments, the ethical preferences that are synthesized may be a joint ethical preferences. The joint ethical preferences may be synthesized based on the collected answers from several investigated parties, such as several passengers. Additionally or alternatively, the joint ethical preferences may be synthesized based on synthesized functions associated with different investigated parties. For example, for each entity, i, a synthesized function IsBetter$_i$ (A, B) may be synthesized. The synthesized function may return a value between −1 and 1, −1 indicating A is better than B, 1 indicating B is better than A, and 0 indicating indifference. The joint function may be computed using weights for each entity, $w_i$, as follows: IsBetter$_{Group}$(A, B)=$\Sigma_{i \in GROUP}(w_i \cdot$IsBetter$_i$(A, B)). The weights may be determined manually, automatically or the like. The weights may be based on characteristics of the investigated parties, such as giving preference to the elder. The weights may be determined based on the answers to the questions, such as answers indicating importance of an issue to an investigated party, as opposed to indifference of an investigated party to ethical-related decisions. Additionally or alternatively, the synthesized function may be provided as a set of weighted sub-functions, each of which associated with a different ethical property (e.g., a child being injured, hurting a cat, driver dying, or the like). For example, IsBetter$_i$(A, B)=$\Sigma_{j \in N}\{\alpha_j \cdot (EP_j(A) - EP_j(B))\}$, where $\alpha_j$ is the weight of entity i with respect to ethical preference j, and EP$_j$(X) is the value for the ethical preference j with respect to the outcome X. The joint functions may be computed using weights for each entity, $w_i$, as follows: IsBetter$_{GROUP}$(A, B)= $\Sigma_{j \in N,\ i \in GROUP}\{w_i \cdot \alpha_j^i \cdot (EP_j^i(A) - EP_j^i(B))\}$, where $\alpha_j^i$ is the weight of entity i with respect to ethical preference j, and EP$_j^i$(X) is the value for the ethical preference j for entity i with respect to outcome X.

On Step 430, ethical preferences are stored in a database. The database may be a local storage database, a remote cloud database, or the like. Additionally or alternatively, the database may be implemented as a distributed system. Additionally or alternatively, the database may be implemented on Storage Device 307 of FIG. 3.

On Step 440, upon an impending accident, the ethical determinator makes a driving related determination. In some exemplary embodiments, the ethical determinator, such as Ethical Determinator 330 of FIG. 3, may apply the active ethical preferences to determine a preferred outcome. Based on the determined preferred outcome, a driving activity that is expected to result in the preferred outcome may be performed.

Figure 5:
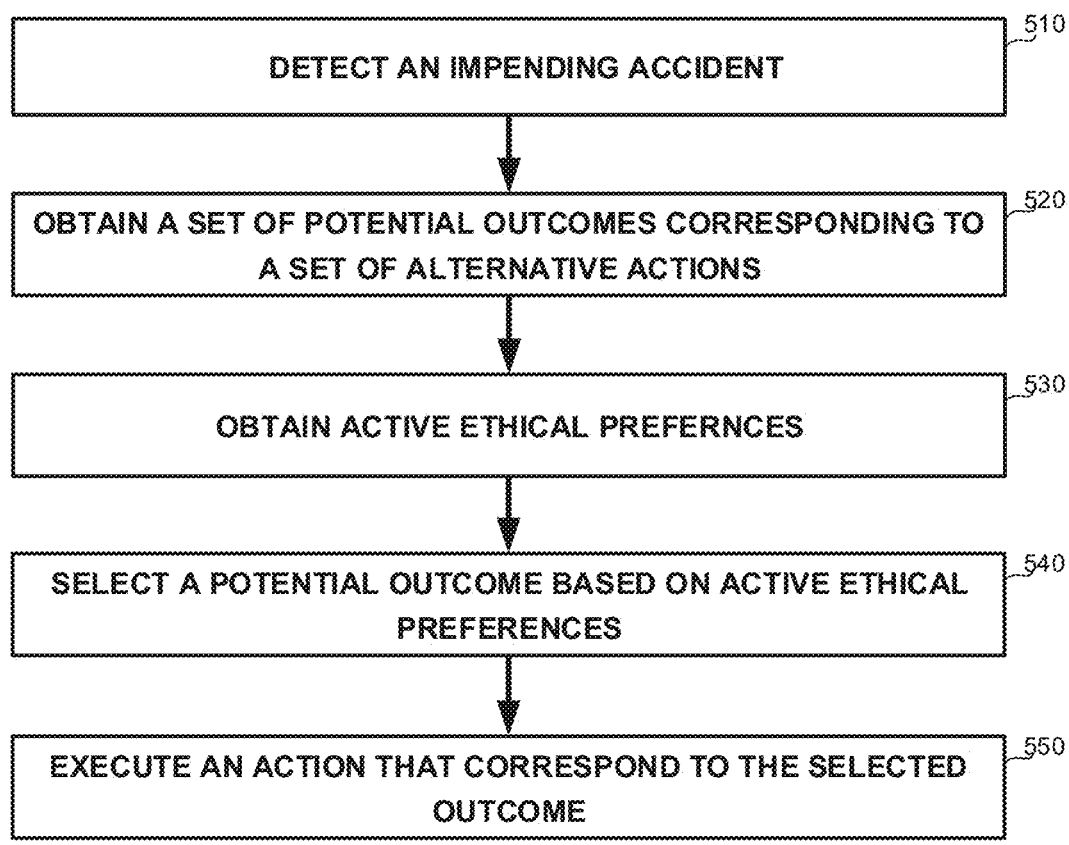

Referring now to FIG. 5 showing a flowchart diagram of a method, in accordance with some exemplary embodiments of the disclosed subject matter.

On Step 510, an impending accident is detected. The detection may be based on the cameras such Cameras 130, 132, 134 of FIG. 1. The detection may be performed by an autonomous driving module of an autonomous vehicle.

On Step 520, a set of alternate actions and a set of corresponding potential outcomes is obtained. As an example, in case that the vehicle is driving on a cliff and a group of children is standing on the road, one action may be to try and brake. The corresponding potential outcome may be risking in hitting the children. A second action may be to deviate and the potential outcome may be to fall off the cliff, spare the children, while killing the passenger.

On Step 530, the active ethical preferences are obtained. The active ethical preferences may be the ethical preference that were synthesized by an ethical synthesizer such as Ethical Synthesizer 320 of FIG. 3. In some exemplary embodiments, there may be a number of passengers in the vehicle. Ethical synthesizer such as Ethical Synthesizer 320 of FIG. 3 may synthesize the active ethical preferences based on the ethical preferences of each of the passengers. The active ethical preferences may be obtained from a data storage retaining ethical preferences of entities. In some exemplary embodiments, the active ethical preferences may be pre-computed. Additionally or alternatively, the active ethical preferences may be computed on demand.

On Step 540, a potential outcome is selected. The potential outcome may be selected based on the active ethical preferences. Referring to the above example, if the active ethical preferences of the passenger are indifferent to hitting children then the selected potential outcome may be risking in hitting the children. Additionally or alternatively, if the active ethical preferences may require avoiding hitting children at all costs, then the selected potential outcome may be to fall off the cliff, while endangering the life of the passenger(s) in the vehicle.

On Step 550, an action is executed. The action may be an action corresponding the selected outcome that was selected on Step 540. The action may be a driving-related action, and as a result the selected outcome may be achieved. Referring again to the example above, the vehicle may deviate, fall off the cliff and save the children in accordance with the active ethical preferences.

Figure 6:
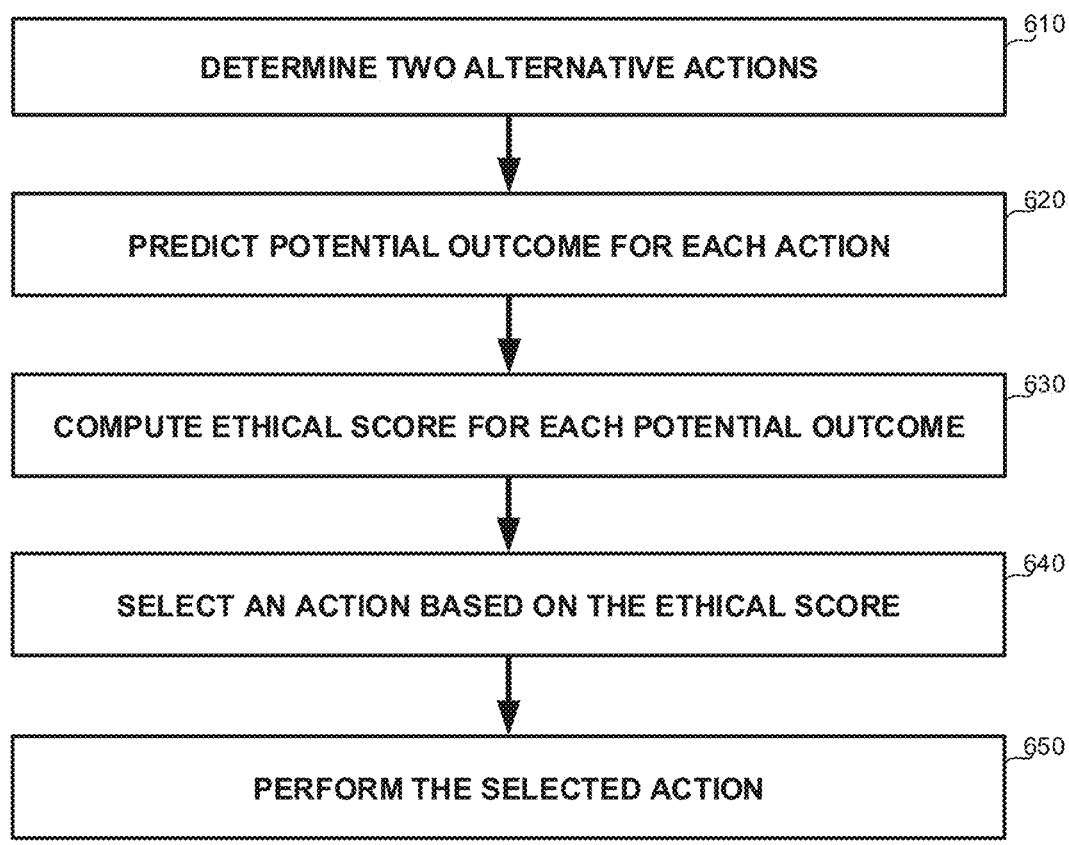

Referring now to FIG. 6 showing a flowchart diagram of a method, in accordance with some exemplary embodiments of the disclosed subject matter.

On Step 610, two alternative actions are determined. As an example, a vehicle may want to merge into traffic. One possible action may be to wait until the road is clear. An alternative action may be to merge without waiting.

On Step 620, for each action, an outcome is predicted. A processor, such as Processor 302 of FIG. 3 or a processor of an autonomous driving module, may be configured to predict outcomes of alternative actions. Referring to the above example, an outcome of waiting for the road to be clear may be prolonging the driving duration by an estimated 30 seconds. An outcome of the alternative action which is merging to the traffic may be forcing another vehicle to slowdown and rudely interrupting traffic, but reaching the destination 30 seconds earlier.

On Step 630, for each outcome, an ethical score is calculated. Each potential outcome may have ethical implications. In some exemplary embodiments, each potential outcome may have a probability associated with it. The ethical score may take into account the probability of the outcome. Referring to the above example, the first action, waiting for the road to be clear, may not have any ethical implication and hence it may be calculated that the ethical score is relatively high. In case of heavy traffic, it may be determined that there is a probability above a threshold of causing a car to slowdown and interrupting traffic while trying to merge into the traffic. Hence, the ethical score of that action may be a relatively low score.

In some exemplary embodiments, the active ethical preferences may be taken into account when calculating an ethical score of an outcome. Referring to the above example, an active ethical preferences may yield that accidents should be avoided and that the vehicle must not take any chances. Hence the ethical score of merging into the traffic may be even lower. Additionally or alternatively, the active ethical preferences may be more risk oriented. A passenger may be willing to risk himself or others in order not to be late. In that case, the ethical score of merging onto the traffic may be higher than in the previous example, and potentially higher than the score of the waiting action.

On Step 640, an action is selected based on the ethical score. The action may be selected by Ethical Determinator of 330 of FIG. 3. Referring again to the above example, the action with highest ethical score may be selected. Hence, the action of waiting for the road to be clear may be selected in one scenario, while in the other scenario, the second action may be selected.

On Step 650, the selected action of Step 650 is performed. The selected action may be sent, delivered, provided, or the like to a computerized module in Vehicle 110 that is driving Vehicle 110 (e.g., autonomous driving module). Referring again to the above example, in case that it was determined to merge into the traffic, the vehicle may continue driving into the road and merge. If the selected action is to wait until the road clear, the vehicle may slow down and wait until the road is clear.

In some exemplary embodiments, the method of FIG. 6 may be combined with the method of FIG. 2A. As an example, on Step 220, it may be determined that the passenger is extremely late for an important meeting. The constraint on the driving route that is determined on Step 230 of FIG. 2 may be a constraint such as to take the fastest route. As a result, the active ethical preferences may be modified to prefer cutting in line over waiting.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system relating to an operation of a self-driving vehicle, wherein the system comprising:
   a processor and a memory coupled thereto;
   an ethical investigator configured to present an ethical questioner to an entity and collect responses of the entity to the ethical questioner;
   an ethical synthesizer configured to synthesize an ethical preference of the entity based on the responses collected by said ethical investigator; and
   an ethical determinator configured to select an action from a plurality of potential actions each associated with a different potential alternative outcome, wherein said ethical determinator is configured to select the action based on an ethical preference of the controlling entity of the self-driving vehicle at a time the selection is made, wherein said system is configured to cause the self-driving vehicle to perform the action selected by said ethical determinator automatically and without relying on user input.

2. The system of claim 1, wherein said system is configured to provide a personalized ethical decision for the self-driving vehicle that is modified based on preferences of the controlling entity that is controlling the self-driving vehicle at the time ethical decision is being made.

3. The system of claim 1, wherein said ethical determinator is configured to be invoked in response to an identification of an impending accident by the self-driving vehicle, wherein the plurality of potential actions are potential actions by the self-driving vehicle that would not prevent the impending accident and would result in different outcomes that are not Pareto improvement of one another.

4. The system of claim 1, wherein the ethical questioner is a dynamic questioner in which questions are selected dynamically based on responses to previous questions.

5. The system of claim 1, wherein the ethical preference is an ethical preference function to compare outcomes, that is configured to take into account at least one of:
   demographic information of a person that is expected to be injured in at least one of the outcomes;
   behavioral information regarding activity of a person that is expected to be injured in at least one of the outcomes;
   information relating to a non-human animal that is expected to be hurt in at least one of the outcomes;
   an expected potential harm to a passenger of the self-driving vehicle in at least one of the outcomes; and
   an expected damage to the self-driving vehicle in at least one of the outcomes.

6. A method relating to an operation of a self-driving vehicle, wherein the method comprising:
   presenting ethical questioner to an entity and collecting responses of the entity to the ethical questioner;
   synthesizing an ethical preference of the entity based on the collected responses;
   selecting an action from a plurality of potential actions each associated with a different potential alternative outcome, wherein the action is selected based on an ethical preference of the entity; and
   causing the self-driving vehicle to perform the selected action selected automatically and without relying on user input.

7. The method of claim 6 further comprises: determining that the entity is a controlling entity of the self-driving vehicle at a time the selection is made.

8. The method of claim 6, further comprises: in response to a determination that a second entity is controlling the self-driving vehicle at a time the selection is made, utilizing a second ethical preference that is associated with the second entity.

9. The method of claim 6, wherein said selecting is performed in response to an identification of an impending accident by the self-driving vehicle, wherein the plurality of potential actions are potential actions by the self-driving vehicle that would not prevent the impending accident and would result in different outcomes that are not Pareto improvement of one another.

10. The method of claim 6, wherein the ethical questioner is a dynamic questioner in which questions are selected dynamically based on responses to previous questions.

11. The method of claim 6, wherein the ethical preference is an ethical preference function to compare outcomes, that is configured to take into account at least one of:
   demographic information of a person that is expected to be injured in at least one of the outcomes;
   behavioral information regarding activity of a person that is expected to be injured in at least one of the outcomes;
   information relating to a non-human animal that is expected to be hurt in at least one of the outcomes;
   an expected potential harm to a passenger of the self-driving vehicle in at least one of the outcomes; and
   an expected damage to the self-driving vehicle in at least one of the outcomes.

12. The method of claim 6, wherein the entity is a passenger of the self-driving vehicle.

13. The method of claim 12 further comprises updating the ethical preference for the self-driving vehicle in response to the passenger disembarking from the self-driving vehicle.

14. The method of claim 6, wherein the entity is a group of passengers of the self-driving vehicle, wherein the ethical preference for the self-driving vehicle is determined based on a joint ethical preference, wherein the joint ethical preference is determined based on responses of each individual passenger in the group of passengers to the ethical questioner.

15. The method of claim 6, wherein the entity is selected from a group consisting of: an owner of the self-driving vehicle, an operator of the self-driving vehicle, and an insurance company insuring the self-driving vehicle.

16. The method of claim 6, wherein the ethical preference for the self-driving vehicle is modified based on pre-defined timeslots, wherein the pre-defined timeslots are associated with different entities.

17. A computer program product comprising a non-transitory computer readable storage medium retaining program instructions, which program instructions when read by a processor, cause the processor to perform a method comprising:
   presenting ethical questioner to an entity and collecting responses of the entity to the ethical questioner;
   synthesizing an ethical preference of the entity based on the collected responses;
   selecting an action from a plurality of potential actions each associated with a different potential alternative outcome, wherein the action is selected based on an ethical preference of the entity; and
   causing a self-driving vehicle to perform the selected action selected automatically and without relying on user input.

18. The computer program product of claim 17, wherein the program instructions further cause the processor to perform: in response to a determination that a second entity is controlling the self-driving vehicle at a time the selection is made, utilizing a second ethical preference that is associated with the second entity.

19. The computer program product of claim 17, wherein the program instructions are utilized to navigate the selecting is performed in response to an identification of an impending accident by the self-driving vehicle, wherein the plurality of potential actions are potential actions by the self-driving vehicle that would not prevent the impending accident and would result in different outcomes that are not Pareto improvement of one another.

20. The computer program product of claim 17, wherein said selecting is performed in response to an identification of an impending accident by the self-driving vehicle, wherein the plurality of potential actions are potential actions by the self-driving vehicle that would not prevent the impending accident and would result in different outcomes that are not Pareto improvement of one another.

* * * * *